(12) United States Patent
Ryu et al.

(10) Patent No.: US 11,462,803 B2
(45) Date of Patent: Oct. 4, 2022

(54) COMPOSITE SEPARATOR, METHOD OF PREPARING THE SAME, AND LITHIUM SECONDARY BATTERY INCLUDING THE SAME

(71) Applicants: Samsung Electronics Co., Ltd., Suwon-si (KR); Samsung SDI Co., Ltd., Yongin-si (KR)

(72) Inventors: Saebom Ryu, Suwon-si (KR); Yonggun Lee, Suwon-si (KR); Toshinori Sugimoto, Hwaseong-si (KR); Dongmin Im, Seoul (KR); Wonseok Chang, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 92 days.

(21) Appl. No.: 16/202,429

(22) Filed: Nov. 28, 2018

(65) Prior Publication Data
US 2019/0326579 A1 Oct. 24, 2019

(30) Foreign Application Priority Data
Apr. 20, 2018 (KR) .................. KR10-2018-0046294

(51) Int. Cl.
*H01M 50/449* (2021.01)
*H01M 10/0525* (2010.01)
(Continued)

(52) U.S. Cl.
CPC ....... *H01M 50/449* (2021.01); *H01M 10/056* (2013.01); *H01M 10/0525* (2013.01);
(Continued)

(58) Field of Classification Search
CPC ............. H01M 2/1686; H01M 50/403; H01M 50/411; H01M 10/0525; H01M 10/056; H01M 2300/0091
See application file for complete search history.

(56) References Cited

U.S. PATENT DOCUMENTS

| 7,503,942 B2 | 3/2009 | Kurihara et al. |
| 9,711,773 B2 | 7/2017 | Lai et al. |
| 9,799,868 B2 | 10/2017 | Iwai et al. |
| 9,997,755 B2 | 6/2018 | Goetzen et al. |

(Continued)

FOREIGN PATENT DOCUMENTS

| CN | 103890999 A | 6/2014 |
| CN | 103956448 A | 7/2014 |

(Continued)

OTHER PUBLICATIONS

Changzhen Man et al., "Enhanced wetting properties of a polypropylene separator for a lithium-ion battery by hyperthermal hydrogen induced cross-linking of poly(ethylene oxide)", Journal of Materials Chemistry A, May 2, 2014, pp. 11980-11986, vol. 2.
(Continued)

*Primary Examiner* — Milton I Cano
*Assistant Examiner* — Mary G Henshaw
(74) *Attorney, Agent, or Firm* — Cantor Colburn LLP

(57) ABSTRACT

A composite separator includes: a porous substrate; and a composite electrolyte on a surface of the porous substrate, the composite electrolyte including block copolymer, an ionic liquid, and a particle, wherein a size of the particle is larger than a pore size of the porous substrate, the particle includes an organic particle, an inorganic particle, an organic-inorganic particle, or a combination thereof, and the particle has a particle size of greater than about 1 micrometer to about 100 micrometers.

22 Claims, 10 Drawing Sheets

(51) Int. Cl.
  *H01M 10/056* (2010.01)
  *H01M 50/403* (2021.01)
  *H01M 50/411* (2021.01)

(52) U.S. Cl.
  CPC ....... *H01M 50/403* (2021.01); *H01M 50/411* (2021.01); *H01M 2300/0091* (2013.01)

(56) References Cited

U.S. PATENT DOCUMENTS

| | | | |
|---|---|---|---|
| 2005/0208383 A1 | 9/2005 | Totsuka et al. | |
| 2014/0248525 A1* | 9/2014 | Iwai | H01M 50/426 429/144 |
| 2015/0030933 A1 | 1/2015 | Goetzen et al. | |
| 2015/0079485 A1* | 3/2015 | Choi | B32B 27/08 429/403 |
| 2015/0333309 A1* | 11/2015 | Lai | H01M 10/4235 429/145 |
| 2015/0372276 A1* | 12/2015 | Mizuno | B32B 27/32 429/145 |
| 2016/0294005 A1 | 10/2016 | Lee et al. | |
| 2016/0336618 A1 | 11/2016 | Lee et al. | |
| 2021/0057703 A1* | 2/2021 | Hamada | H01M 50/449 |

FOREIGN PATENT DOCUMENTS

| | | |
|---|---|---|
| CN | 104115306 A | 10/2014 |
| CN | 107240663 A | 10/2017 |
| EP | 3240087 A1 | 11/2017 |
| JP | 2009259755 A | 11/2009 |
| JP | 4705334 B2 | 6/2011 |
| KR | 0671186 B1 | 1/2007 |
| KR | 20140116415 A | 10/2014 |
| KR | 101455943 B1 | 11/2014 |

OTHER PUBLICATIONS

Ki Jae Kim et al., "Ceramic composite separators coated with moisturized ZrO2 nanoparticles for improving the electrochemical performance and thermal stability of lithium ion batteries", Royal Society Of Chemistry, Mar. 24, 2014, pp. 9337-9343, vol. 16.

Yamgyang Xi et al., "Membrane Separators Coated by TIO2-PMMA with Low Thermal Shrinkage Rate for Lithium-Ion Batteries", International Journal Of Electrochemical Science, May 12, 2017, pp. 5421-5430, vol. 12.

Yong Xie et al., "Enhancement on the wettability of lithium battery separator toward nonaqueous electrolytes", Journal of Membrane Science, Dec. 31, 2015, pp. 25-30, vol. 503.

Feng Hua Jun et al., "Preparation and Characterization of a Novel Kind of Polymer Electrolyte CompositeMembrane for Lithium-Ion Battery," Wuli Huaxue Xuebao, Acta Phys. -Chim. Sin., Oct. 24, 2007, pp. 1922-1926, vol. 23, No. 12.

Office Action dated Aug. 1, 2022 of CN Patent Application No. 201910018669.6.

\* cited by examiner

COMPOSITE SEPARATOR, METHOD OF PREPARING THE SAME, AND LITHIUM SECONDARY BATTERY INCLUDING THE SAME

CROSS-REFERENCE TO RELATED APPLICATION

This application claims priority to and the benefit of Korean Patent Application No. 10-2018-046294, filed on Apr. 20, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to a composite separator, a method of preparing the composite separator, and a lithium secondary battery including the composite separator.

2. Description of the Related Art

Lithium secondary batteries are high-performance batteries having the highest energy density among available secondary batteries, and are applicable to various fields such as electric vehicles.

To improve battery safety, a separator of a lithium secondary battery may be impregnated with an ionic liquid or a high-viscosity liquid electrolyte. However, the separator may not be sufficiently impregnable with the ionic liquid or high-viscosity liquid electrolyte. Accordingly, a separator with a coating layer containing inorganic nanoparticles and a non-conductive polymer on a porous substrate may be used as the separator of a lithium secondary battery. However, the inorganic nanoparticles may be unevenly distributed over the coating layer, non-uniformly filling pores of the porous substrate, leading to a non-uniform separator. This may cause localized growth of lithium dendrites and increase interfacial resistance. Therefore, desired is an improved separator material.

SUMMARY

Provided are a composite separator and a method of preparing the composite separator.

Provided is a lithium secondary battery having improved cell performance by inclusion of the composite separator.

Additional aspects will be set forth in part in the description which follows and, in part, will be apparent from the description, or may be learned by practice of the presented embodiments.

According to an embodiment, a composite separator includes: a porous substrate; and a composite electrolyte on a surface of the porous substrate, the composite electrolyte including a block copolymer, an ionic liquid, and a particle, wherein a size of the particle is larger than a pore size of the porous substrate, the particle includes an organic particle, an inorganic particle, an organic-inorganic particle, or a combination thereof, and the particle has a particle size of greater than about 1 micrometer ($\mu m$) to about 100 $\mu m$.

According to an embodiment, a lithium secondary battery includes: a positive electrode; a negative electrode; and the composite separator located between the positive electrode and the negative electrode.

According to an embodiment, a method of preparing the composite separator includes: mixing the ionic liquid, the block copolymer, the particle, and an organic solvent to provide a composite electrolyte composition; coating the composite electrolyte composition on the porous substrate; and drying the coated composition to prepare the composite separator.

In an embodiment, the preparing of the composite electrolyte composition may further include adding a liquid electrolyte including a lithium salt and a non-aqueous organic solvent.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
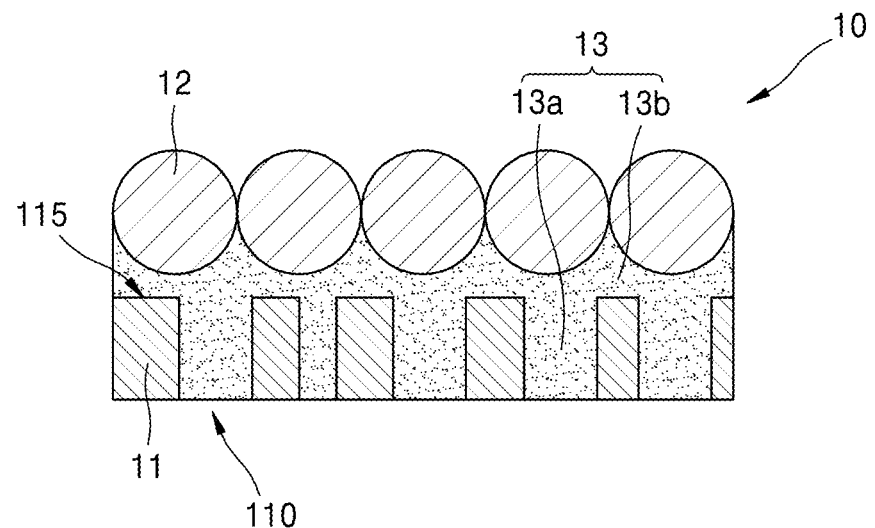
FIGS. 1A and 1B are each a schematic views of an embodiment of a structures of the composite separator.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

"Aliphatic" means a saturated or unsaturated linear or branched hydrocarbon group. An aliphatic group may be an alkyl, alkenyl, or alkynyl group, for example.

"Alkenyl" means a straight or branched chain, monovalent hydrocarbon group having at least one carbon-carbon double bond (e.g., ethenyl (—HC=CH$_2$)).

"Alkoxy" means an alkyl group that is linked via an oxygen (i.e., alkyl-O—), for example methoxy, ethoxy, and sec-butyloxy groups.

"Alkyl" means a straight or branched chain, saturated, monovalent hydrocarbon group (e.g., methyl or hexyl).

"Alkylene" means a straight or branched chain, saturated, divalent aliphatic hydrocarbon group, (e.g., methylene (—CH$_2$—) or, propylene (—(CH$_2$)$_3$—)).

"Alkynyl" means a straight or branched chain, monovalent hydrocarbon group having at least one carbon-carbon triple bond (e.g., ethynyl).

"Amide" means a group of the formula —C(O)—N(Rx)(Ry) or —N(Ry)-C(O)—Rx, wherein Rx is a C1-C30 alkyl group, a C3-C8 cycloalkyl group a C2-C30 alkenyl group, a C2-C30 alkynyl group, or a C6-C30 aryl group, each of which may be substituted or unsubstituted; and Ry is hydrogen or any of the groups listed for Rx.

"Amine" has the general formula NRR, wherein each R is independently hydrogen, a C1-C30 alkyl group, a C3-C8 cycloalkyl group a C2-C30 alkenyl group, a C2-C30 alkynyl group, or a C6-C30 aryl group, each of which may be substituted or unsubstituted.

"Arene" means a hydrocarbon having an aromatic ring, and includes monocyclic and polycyclic hydrocarbons wherein the additional ring(s) of the polycyclic hydrocarbon may be aromatic or nonaromatic. Specific arenes include benzene, naphthalene, toluene, and xylene.

"Aryl" means a monovalent group formed by the removal of one hydrogen atom from one or more rings of an arene (e.g., phenyl or naphthyl).

"Arylalkyl" means an aryl group linked via an alkylene moiety. The specified number of carbon atoms (e.g., C7 to C30) means the total number of carbon atoms present in both the aryl and the alkylene moieties. Representative arylalkyl groups include, for example, benzyl, which is a C7 arylalkyl group.

"Carbocyclic" as used herein means a cyclic group having at least one ring with only carbon atoms in the ring. One or more rings may be present, and each ring may be saturated, unsaturated, or aromatic.

"Cycloalkenyl" means a monovalent group having one or more rings and one or more carbon-carbon double bond in the ring, wherein all ring members are carbon (e.g., cyclopentenyl and cyclohexenyl).

"Cycloalkyl" means a monovalent group having one or more saturated rings in which all ring members are carbon (e.g., cyclopentyl and cyclohexyl).

"Halo" means a group or compound including one or more of a fluoro, chloro, bromo, iodo, and astatino substituent. A combination of different halo groups (e.g., bromo and fluoro) can be present.

"Hetero" means that the compound or group includes at least one a heteroatom (e.g., 1, 2, or 3 heteroatom(s)), wherein the heteroatom(s) is each independently N, O, S, Si, or P.

"Heteroaryl" means a monovalent carbocyclic ring group that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, spiro or fused. The heteroatom(s) are generally independently nitrogen (N), oxygen (O), P (phosphorus), or sulfur (S).

"Imide" means a group having two carbonyl groups bound to nitrogen, e.g., succinimide, "Substituted" means that the compound or group is substituted with at least one (e.g., 1, 2, 3, or 4) substituent, and the substituents are independently a hydroxyl (—OH), a C1-9 alkoxy, a C1-9 haloalkoxy, an oxo (=O), a nitro (—NO$_2$), a cyano (—CN), an amino (—NH$_2$), an azido (—N$_3$), an amidino (—C(=NH)NH$_2$), a hydrazino (—NHNH$_2$), a hydrazono (=N—NH$_2$), a carbonyl (—C(=O)—), a carbamoyl group (—C(O)NH$_2$), a sulfonyl (—S(=O)$_2$—), a thiol group (—SH), a thiocyano (—SCN), a tosyl (CH$_3$C$_6$H$_4$SO$_2$—), a carboxylic acid group (—C(=O)OH), a carboxylic C1 to C6 alkyl ester group (—C(=O)OR wherein R is a C1 to C6 alkyl group), a carboxylic acid salt group (—C(=O)OM) wherein M is an organic or inorganic anion, a sulfonic acid group (—SO$_3$H$_2$), a sulfonic mono- or dibasic salt group (—SO$_3$MH or —SO$_3$M$_2$ wherein M is an organic or inorganic anion), a phosphoric acid group (—PO$_3$H$_2$), a phosphoric acid mono- or dibasic salt group (—PO$_3$MH or —PO$_3$M$_2$ wherein M is an organic or inorganic anion), a C1 to C12 alkyl, a C3 to C12 cycloalkyl, a C2 to C12 alkenyl, a C5 to C12 cycloalkenyl, a C2 to C12 alkynyl, a C6 to C12 aryl, a C7 to C13 arylalkyl, a C4 to C12 heterocycloalkyl, or a C3 to C12 heteroaryl instead of hydrogen, provided that the substituted atom's normal valence is not exceeded. The indicated number of carbon atoms for any group herein is exclusive of any substituents.

Hereinafter, an embodiment of a composite separator and a lithium secondary battery including the composite separator will be disclosed in further detail.

In accordance with an embodiment, a composite separator comprises: a porous substrate; and a composite electrolyte on a surface of the porous substrate, the composite electrolyte including a block copolymer, an ionic liquid, and a particle, wherein a size of the particle is larger than a pore size of the porous substrate, wherein the particle comprises an organic particle, an inorganic particle, an organic-inorganic particle, or a combination thereof, and wherein the particle has a particle size of greater than about 1 micrometer (µm) to about 100 µm.

The composite electrolyte may be disposed on a single surface of the porous substrate, or on multiple surfaces.

The composite membrane may have a structure in which a pore of the porous substrate is filled with the ionic liquid and the block copolymer, and the particle may be evenly distributed on the surface of the composite separator, and in particular, the particle may be distributed on a surface of the composite electrolyte, which is disposed on the porous substrate. The particle may have a size which is larger than an average pore diameter of the porous substrate, and thus no particle may be present in the pore of the porous substrate. The ionic liquid and the block copolymer may be present in the pore of the porous substrate and on the surface of the porous substrate.

A poly(propylene) or poly(ethylene) microporous film-type separator may not be sufficiently impregnable with an ionic liquid or may not have a satisfactory wettability with respect to a high-viscosity liquid electrolyte. Also, when a ceramic coated poly(propylene) or poly(ethylene) microporous film-type separator is used, e.g., a separator having an inorganic particle-containing coating layer, a pore of the microporous substrate may be clogged with an inorganic particle unevenly filling the pore. Accordingly, when a microporous film-type separator is stacked on a lithium negative electrode, a lithium dendrite may non-uniformly grow in a region of the lithium negative electrode.

However, in the composite separator according to an embodiment, the particle may be uniformly present on a surface of the composite electrolyte, and not in the pore of the porous substrate. Unlike the inorganic particle present in the pore of the microporous film-type porous substrate, the particle on the composite electrolyte may not inhibit transfer and flow of lithium ions and ensures uniform transfer of charges. As a result, the composite separator may have improved ion conductivity and a uniform mechanical strength over the entire separator. Using the composite separator may effectively inhibit local growth of a lithium dendrite and accordingly decrease the probability of a short circuit in a lithium secondary battery using the composite separator.

The block copolymer of the composite electrolyte of the composite separator according to an embodiment may have suitable ion conductivity for use in a lithium battery. Accordingly, despite the presence of the composite electrolyte on the porous substrate, an increase in resistance caused due to the presence of the composite electrolyte may be inhibited.

In an embodiment, the block copolymer of the composite electrolyte may have an increased miscibility with the ionic liquid due to having an ion-conductive domain and thus may increase the ion conductivity of the composite separator. The block copolymer and the particle of the composite electrolyte may improve a mechanical strength of the composite electrolyte. As the composite electrolyte is disposed on the porous substrate, thermal stability of the composite separator may be increased.

When the particle in the composite electrolyte has a size greater than about 100 micrometers (µm), the composite electrolyte may have an increased thickness. Consequently, a lithium secondary battery including the composite separator may have an increased thickness, and the lithium secondary battery may have reduced energy density. In addition, an increased porosity of a composite electrolyte may facilitate contact of the ionic liquid to a lithium metal electrode.

When the particle size of the composite electrolyte is 1 µm or less, a lithium secondary battery including such a composite electrolyte including the particle having a particle size within this range may have reduced lithium deposition density characteristics as compared to a lithium secondary battery using the composite electrolyte including the particle having a particle size of greater than about 1 µm and smaller than or equal to 100 µm.

For example, the particle size of the particle may be about 1.1 µm to about 50 µm, and in an embodiment, about 1.5 µm to about 20 µm, and in an embodiment, about 3 µm to about 20 µm.

As used herein, the expression "size" of a particle or "particle size" may refer to an average particle diameter when particles are spherical, or may refer to the length of a major axis when the particles are non-spherical.

As used herein, the term "average particle diameter" may refer to an average particle diameter (D50) corresponding to 50% in a cumulative distribution curve of total particles accumulated from smallest to largest in size, wherein the number of the total accumulated particles is assumed as 100%.

The average particle diameter may be determined according to any suitable method, for example, by light scattering using a particle size analyzer (available from Horiba), from a transmission electron microscope ("TEM") image, or from a scanning electron microscopy ("SEM") image. The method of determining the average particle size may be based on dynamic light scattering, wherein an average particle diameter may be calculated from the number of particles within a certain size range counted using dynamic light scattering.

In an embodiment, the particle may be a microsphere having a monomodal particle size distribution. The monomodal particle diameter distribution may be defined as being within a standard deviation of less than about 40%, for example, about 20% or less, about 10% or less, about 1% or greater to less than about 40%, about 2% to about 25%, or about 3% to about 10%, when analyzed by dynamic light scattering ("DLS") using a particle diameter analyzer (e.g., a Nicomp 380, available from Particle Sizing Systems of Port Richey, Fla.).

The particle of the composite electrolyte may have a cross-linked structure. The particles having a chemically or physically cross-linked structure may include an organic particle, comprising, consisting essentially of, or consisting of, a cross-linked polymer obtained from a polymer having a cross-linkable functional group, an inorganic particle having a cross-linked structure due to a cross-linkable functional group on a surface thereof, or a combination thereof. The cross-linkable functional group, a functional group that takes part in cross-linking reaction, may be, for example, a group having a carbon-carbon double bond, such as an acryl group ($H_2C$=CHC(=O)O—), a methacryl group ($H_2C$=C($CH_3$)HC(=O)O—), a vinyl group ($H_2C$=CH—), an allyl group ($H_2C$=$CHCH_2$—), or the like, or a combination thereof.

Cross-linking may be induced by heating or ultraviolet ("UV") ray irradiation. The heating or light irradiation may be performed within a range that does not adversely affect the lithium metal electrode.

A particle having a chemically cross-linked structure refers to a particle in which cross-linking has occurred by a chemical method (for example, using chemical reagents) of covalently bonding cross-linkable functional groups in a material for forming the particle. A particle having a physically cross-linked structure refers to a particle in which cross-linking has occurred by, for example, heating a polymer forming the particle to reach a glass transition temperature of the polymer in the state where cross-linking of binding cross-linkable functional groups by chemical reagents has not occurred. The cross-linking may occur within the particle or between adjacent particles in the composite separator.

The particle may have any suitable shape, and may be spherical, a rod shape, an elliptical shape, a random shape, or a combination thereof. The amount of the particle may be about 1 part to about 50 parts by weight, for example, about 2 parts to about 45 parts by weight, about 4 parts to about 40 parts by weight, or about 1 part to about 30 parts by weight, with respect to 100 parts by weight of a total weight of the ionic liquid, the block copolymer, and the particle. When the size and content of the particle is within these ranges, the particle may be uniformly distributed on a surface of the composite separator, not in the pore of the porous substrate, so as not to block flow of lithium ions.

FIG. 1A is a schematic view illustrating a structure of an embodiment of a composite separator 10.

Referring to FIG. 1A, the composite separator 10 may have a structure in which the composite electrolyte 13 is located in a pore 110 of the porous substrate 11 and on a surface 115 of the porous substrate 11. The composite electrolyte 13 may include an ionic liquid, a block copolymer, and a particle 12. The particle 12 may be an organic particle. As illustrated in FIG. 1A, the particle 12 may not be present in the pore 110 of the porous substrate 11. A first composite electrolyte domain 13a including the ionic liquid and the block copolymer may be disposed in the pore 110 of the porous substrate 11, and a second composite electrolyte domain 13b including the particle 12 may be disposed on the surface 115 of the porous substrate 11. Due to this structure of the composite separator 10 in which the particle 12 is locally present on the surface of the composite separator 10, when the composite separator 10 is stacked on a lithium negative electrode, growth of lithium dendrite on the lithium negative electrode may be effectively inhibited. As a result, a lithium deposition layer formed on the lithium negative electrode may have improved lithium deposition density.

The block copolymer of the composite electrolyte 13 may serve as a binder. When the block copolymer is used, the composite separator may have improved mechanical strength. When the block copolymer is used together with the ionic liquid, the composite separator may have improved ion conductivity. The particle may be an organic particle. The organic particle may be a poly(styrene)-based microsphere. When the poly(styrene)-based microsphere is used, miscibility and dispersibility of the block copolymer and the organic particles in the composite electrolyte may be improved, unlike when an inorganic particle is used.

The poly(styrene)-based microsphere may be a particle having a uniform size and may have an average particle diameter of about 3 μm to about 20 μm, about 4 μm to about 18 μm, or about 5 μm to about 16 μm.

Figure 1B:
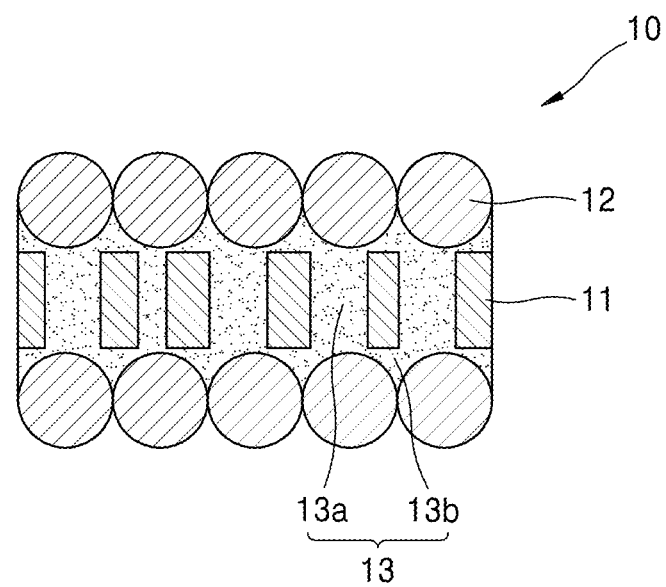

FIG. 1B is a schematic view illustrating a structure of a composite separator 10 according to an embodiment.

Referring to FIG. 1B, the composite separator 10 has the same structure as the composite separator of FIG. 1A, except that composite electrolyte 13 is present on opposite surfaces of the porous substrate 11.

Figure 2A:
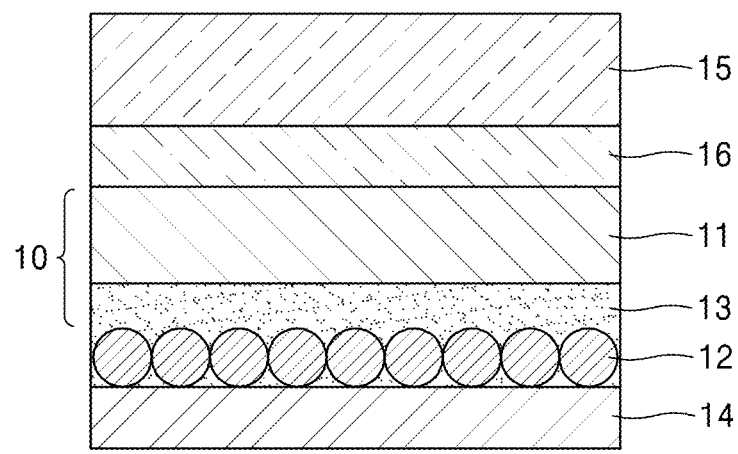
FIGS. 2A and 2B are each a schematic view of an embodiment of a structure of a lithium secondary battery, each including the composite separator.
Figure 2B:
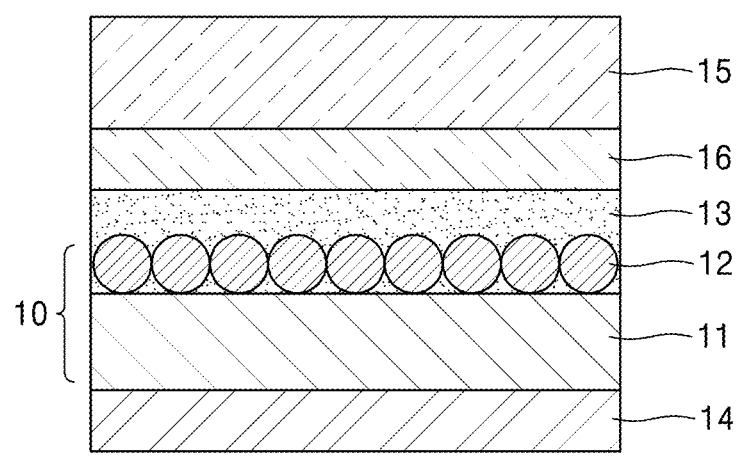

FIGS. 2A and 2B each illustrate a structure of a lithium secondary battery, each including a composite separator according to an embodiment. In FIGS. 2A and 2B, the particle in the composite separator may be, for example, an organic particle.

Referring to FIG. 2A, a lithium secondary battery according to an embodiment may have a structure in which a composite separator 10 is disposed on a negative electrode 14, and an electrolyte 16 and a positive electrode 15 are sequentially disposed on the composite separator 10. The composite separator 10 may include a porous substrate 11, and a composite electrolyte 13 including an organic particle 12, a block copolymer, and an ionic liquid. The organic particle 12 in the composite electrolyte 13 may be adjacent to the negative electrode 14. The composite electrolyte 13 may further include an electrolyte containing a lithium salt, an organic solvent, a polymer ionic liquid, or a combination thereof.

The ionic liquid may not be specifically limited, and may be any suitable ionic material in a molten state at room temperature (25° C.) and including a cation and an anion. For example, the cation of the ionic liquid may comprise an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, or a combination thereof, and the anion may comprise $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_5SO_2)_2N^-$, $(C2F_5SO_2)(CF_3SO_2)N^-$, $(CF_3SO_2)_2N^-$, or a combination thereof.

In an embodiment, the ionic liquid may comprise, for example, [ethyl methyl imidazolium (emim)]Cl/$AlCl_3$,

[butyl methyl pyridinium (bmpyr)]bis(trifluoromethanesulfon)imide (NTf$_2$), [4,4'-bipyridine (bpy)]Br/AlCl$_3$, [choline]Cl/CrCl$_3$.6H$_2$O, [emim] trifluoromethane sulfonate (OTf)/[hexyl methyl imidazolium (hmim)], [choline]Cl/HOCH$_2$CH$_2$OH, [ethyl (Et)$_2$ methyl (Me)N(CH$_2$CH$_2$OMe)] BF$_4$, [butyl (Bu)$_3$PCH$_2$CH$_2$C$_8$F$_{17}$]OTf, [butyl methyl imidazolium (bmim)]PF$_6$, [bmim]BF$_4$, [octyl methyl imidazolium (omim)]PF$_6$, [octyl (Oct)$_3$PC$_{18}$H$_{37}$]I, [NC(CH$_2$)$_3$methyl imidazolium (mim)]NTf$_2$, [propyl (Pr)$_4$N][B(CN)$_4$], [bmim]NTf$_2$, [bmim]Cl, [bmim][Me(OCH$_2$CH$_2$)$_2$OSO$_3$], [PhCH$_2$mim]OTf, [Me$_3$NCH(Me)CH(OH)phenyl (Ph)]NTf$_2$, [propyl methyl imidazolium (pmim)][(HO)$_2$PO$_2$], [butyl (b)(6-Me)quinolinium (quin)]NTf$_2$, [bmim][Cu$_2$Cl$_3$], [C$_{18}$H$_{37}$OCH$_2$mim]BF$_4$, [hexyl ethyl imidazolium (heim)]PF$_6$, [mim(CH$_2$CH$_2$O)$_2$CH$_2$CH$_2$mim][NTf$_2$]$_2$, [octyl butyl imidazolium (obim)]PF$_6$, [octyl quinolinium (oquin)]NTf$_2$, [hmim][PF$_3$(C$_2$F$_5$)$_3$], [C$_{14}$H$_{29}$mim]Br, [Me$_2$N(C$_{12}$H$_{25}$)$_2$]NO$_3$, [emim]BF$_4$, [mm(3-NO$_2$)im][dinitrotriazolate], [MeN(CH$_2$CH$_2$OH)$_3$], [MeOSO$_3$], [hexyl (Hex)$_3$PC$_{14}$H$_{29}$]NTf$_2$, [emim][EtOSO$_3$], [choline][ibuprofenate], [emim]NTf$_2$, [emim][(EtO)$_2$PO$_2$], [emim]Cl/CrCl$_2$, [Hex$_3$PC$_{14}$H$_{29}$]N(CN)$_2$, or combination thereof. However, embodiments are not limited thereto. Any suitable compound that may be used as an ionic liquid may be used.

The organic solvent may include an aprotic solvent or protic solvent. For example, the aprotic solvent may comprise a carbonate-based solvent, an ester-based solvent, an ether-based solvent, a ketone-based solvent, or a combination thereof. For example, the aprotic solvent may comprise an alcohol-based solvent. Examples of the carbonate-based solvent may include dimethyl carbonate ("DMC"), diethyl carbonate ("DEC"), ethyl methyl carbonate ("EMC"), dipropyl carbonate ("DPC"), methyl propyl carbonate ("MPC"), ethyl propyl carbonate ("EPC"), methyl ethyl carbonate ("MEC"), ethylene carbonate ("EC"), propylene carbonate ("PC"), and butylene carbonate ("BC"). Examples of the ether-based solvent may include tetraethylene glycol dimethyl ether ("TEGDME"). Examples of the ester-based solvent may include methyl acetate, ethyl acetate, n-propyl acetate, t-butyl acetate, methyl propionate, ethyl propionate, γ-butyrolactone, decanolide, valerolactone, mevalonolactone, caprolactone, or combination thereof. Examples of the ether-based solvent may include dibutyl ether, tetraglyme, diglyme, dimethoxyethane, 2-methyl tetrahydrofuran, tetrahydrofuran, or combination thereof. An example of the ketone-based solvent may be cyclohexanone. Examples of the alcohol-based solvent may include ethyl alcohol, isopropyl alcohol, or the like. However, embodiments are not limited thereto. Any suitable aprotic solvent may be used.

In an embodiment, the polymer ionic liquid may be prepared by polymerization of ionic liquid monomer. For example, the ionic liquid monomer may have a polymerizable functional group such as a vinyl group, an allyl group, an acrylate group, a methacrylate group, or a combination thereof, and may include a cation, e.g., an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, or a combination thereof, and a anion as disclosed above.

An example of the ionic liquid monomer is 1-vinyl-3-ethylimidazolium bromide, a compound represented by Formula 1, a compound represented by Formula 2, or a combination thereof.

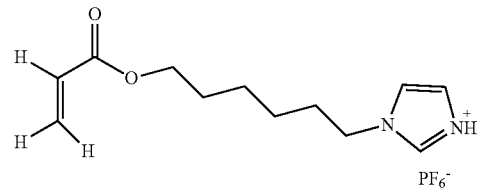

Formula 1

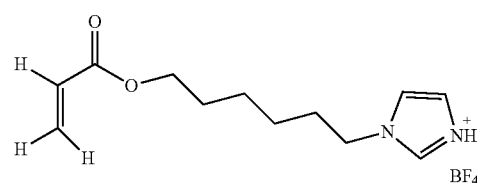

Formula 2

For example, the polymer ionic liquid may be a compound represented by Formula 3 or a compound represented by Formula 4.

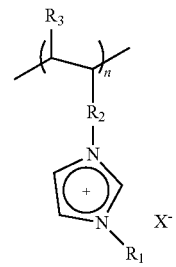

Formula 3

In Formula 3,

R$_1$ and R$_3$ may be each independently a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group;

R$_2$ may be a chemical bond, a C1-C3 alkylene group, a C6-C30 arylene group, a C2-C30 heteroarylene group, or a divalent C4-C30 carbocyclic group;

X$^-$ indicates an anion of the ionic liquid; and n may be from about 500 to 2,800.

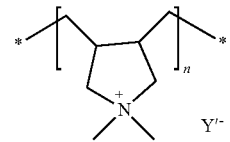

Formula 4

In Formula 4, Y'$^-$ may be defined the same as X$^-$ in Formula 3; and n may be from 500 to 2,800.

In Formula 4, Y$^-$ may be, for example, bis(trifluoromethylsulfonyl)imide (TFSI), bis(fluorosulfonyl)imide, BF$_4^-$, or CF$_3$SO$_3^-$.

A cation of the polymer ionic liquid may comprise poly(1-vinyl-3-alkylimidazolium), poly(1-allyl-3-alkylimidazolium), poly(1-(methacryloyloxy-3-alkylimidazolium), or combination thereof, and an anion of the polymer ionic liquid may comprise $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, or $(CF_3SO_2)(CF_3CO)N^-$.

The compound represented by Formula 4 may be poly(diallydimethyl ammonium bis(trifluoromethylsulfonyl)imide).

In an embodiment, the polymer ionic liquid may include a low-molecular weight polymer, a thermally stable ionic liquid, and a lithium salt. The low-molecular weight polymer may have an ethylene oxide chain. The low-molecular weight polymer may be a glyme. Examples of the glyme are poly(ethyleneglycol dimethylether) ("polyglyme"), tetraethyleneglycol dimethyl ether ("tetraglyme"), and triethyleneglycol dimethylether ("triglyme").

The low-molecular weight polymer may have a weight average molecular weight of about 75 Daltons to about 2000 Daltons, for example, a weight average molecular weight of about 250 Daltons to about 500 Daltons. The "weight average molecular weight" herein may be measured by gel permeation chromatography.

The electrolyte 16 may be a liquid electrolyte, a solid electrolyte, a gel electrolyte, an ionic liquid, a polymer ionic liquid, or a combination thereof.

The liquid electrolyte may include a lithium salt and an organic solvent. The gel electrolyte, which is an electrolyte in gel form, may be any suitable gel electrolyte. The gel electrolyte may include, for example, a polymer and a polymeric ionic liquid. For example, the polymer may be a solid graft (block) copolymer.

The solid electrolyte may be, for example, an organic solid electrolyte or an inorganic solid electrolyte. Non-limiting examples of the organic solid electrolyte are a polyethylene derivative, a polyethylene oxide derivative, a polypropylene oxide derivative, phosphoric acid ester polymer, polyester sulfide, polyvinyl alcohol, polyfluoride vinylidene, a polymer including an ionic dissociative group, or a combination thereof.

Non-limiting examples of the inorganic solid electrolyte are $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S.GeS_2.Ga_2S_3$, $Li_2O.11Al_2O_3$, $(Na, Li)_{1+x}Ti_{2-x}Al_x(PO_4)_3$ (wherein 0.1≤x≤0.9), $Li_{1+x}Hf_{2-x}Al_x(PO_4)_3$ (wherein 0.1≤x≤0.9), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-silicate, $Li_{0.3}La_{0.5}TiO_3$, $Na_5MSi_4O_{12}$ (wherein M may be a rare earth element, for example, Nd, Gd, Dy, or the like), $Li_5ZrP_3O_{12}$, $Li_5TiP_3O_{12}$, $Li_3Fe_2P_3O_{12}$, $Li_4NbP_3O_{12}$, $L_{1+x}(M,Al,Ga)_x(Ge_{1-y}Ti_y)_{2-x}(PO_4)_3$ (wherein 0≤x≤0.8, 0≤y≤1.0, M may be Nd, Sm, Eu, Gd, Tb, Dy, Ho, Er, Tm, or Yb), $Li_{1+x+y}Q_xTi_{2-x}Si_yP_{3-y}O_{12}$ (wherein 0<x≤0.4, 0<y≤0.6, and Q may be Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M may be Nb, Ta), $Li_{7+x}A_xLa_{3-x}Zr_2O_{12}$ (wherein 0<x<3, A may be Zn), or a combination thereof.

The lithium secondary battery of FIG. 2B may have the same structure as that of the lithium secondary battery of FIG. 2A, except that the organic particle 12 of the composite separator 10 is located closer to the electrolyte 16, unlike the lithium secondary battery of FIG. 2A having a structure in which the organic particle 12 in the composite electrolyte 13 is located adjacent to the negative electrode 14. When the negative electrode 14 is a lithium electrode, the effect of suppressing growth of lithium dendrite on the lithium electrode may be improved. The lithium secondary battery of FIG. 2B may have improved electrolyte impregnation characteristics, as compared to the lithium secondary battery of FIG. 2A.

The particle 12 may have a size of about 3 µm to about 50 µm, about 6 µm to about 40 µm, or about 9 µm to about 30 µm, for example, about 3 µm to about 10 µm.

The porous substrate may have a pore size of less than or equal to about 3 µm, e.g., about 0.1 µm to about 3 µm, about 0.05 µm to about 2.5 µm, for example, about 2 µm. As used herein, the term "pore size" of the porous substrate indicates an average diameter when the pores are spherical, or a length of the major axis when the pores are non-spherical. In an embodiment, the pore size may mean a maximum pore size.

The block copolymer may serve as a binder that facilitates binding of the particle to the surface of the porous substrate and improve mechanical strength of the composite electrolyte. The amount of the block copolymer may be less than 80 parts by weight, for example, about 1 part to about 80 parts by weight, about 2 parts to about 70 parts by weight, or about 3 parts to about 50 parts by weight, with respect to 100 parts by weight of a total weight of the ionic liquid, the block copolymer, and the organic particle. When the amount of the block copolymer is within these ranges, a composite separator having improved ion conductivity may be obtained.

The block copolymer may be a block copolymer having an ion-conductive domain and a structural domain, or a block copolymer having an ion-conductive domain and a rubbery elastomeric, e.g., elastomeric domain. The block copolymer having such a structure may have improved mechanical strength and improved ion conductivity.

The ion-conductive domain may include a polymer segment including an ion-conductive repeating unit, and the polymer segment including the ion-conductive repeating unit may be poly(ethylene oxide) ("PEO"), poly(propylene oxide), poly(methyl methacrylate), poly(ethyl methacrylate), poly(dimethylsiloxane), poly(acrylic acid), poly(methacrylic acid), poly(methyl acrylate), poly(ethyl acrylate), poly(2-ethylhexyl acrylate), poly(butyl methacrylate), poly(2-ethylhexyl methacrylate), poly(decyl acrylate), poly(ethylene-vinyl acetate), a poly(imide), a poly(amine), a poly(amide), a poly(di(C1-12 alkyl) carbonate), a poly(nitrile), a poly(phosphazine), a poly(olefin), a poly(diene), or a combination thereof.

The rubbery domain may be a polymer segment including a rubbery (i.e., elastomeric) repeating unit, and the polymer segment including the elastomeric repeating unit may be poly(isoprene), poly(butadiene), poly(chloroprene), poly(isobutylene), poly(urethane), or a combination thereof.

The structural domain may include a polymer segment including a structural repeating unit, and the polymer segment including the structural repeating unit may include: i) poly(styrene) ("PS"), hydrogenated poly(styrene), a poly((C1-C6 alkyl) methacrylate), poly(methyl methacrylate), poly(vinylpyridine), poly(vinylcyclohexane), a poly(imide), a poly(amide), poly(ethylene), poly(isobutylene), poly(butylene), poly(propylene), poly(4-methyl-1-pentene), poly(butylene terephthalate), poly(isobutyl methacrylate), poly(ethylene terephthalate), poly(dimethylsiloxane), poly(acrylonitrile), poly(maleic acid), poly(maleic acid anhydride), poly(methacrylic acid), poly(tert-butyl vinyl ether), poly(cyclohexyl methacrylate), poly(cyclohexyl vinyl ether), poly(vinylidene fluoride), poly(divinylbenzene), or a combination thereof; or ii) a copolymer including at least two repeating units of the above-listed polymers.

The block copolymer may be a poly(styrene-ethylene oxide-styrene) block copolymer, a poly(styrene-isoprenestyrene) block copolymer, a poly(styrene-ethylene-styrene) block copolymer, a poly(methyl methacrylate-butylene) block copolymer, or a combination thereof.

The particle may be organic particle. The organic particle may include poly(styrene), a copolymer including a styrene repeating unit, a copolymer including a repeating unit with a cross-linked functional group, in particular a cross-linked double bond, or a combination thereof. The organic particle may comprise a polymer, a cross-linked polymer, or a combination thereof, wherein the polymer may comprise polystyrene, a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, poly(acrylonitrile-ethylene-propylene-styrene) copolymer, a poly(methyl methacrylate-acrylonitrile-butadiene-styrene) copolymer, a poly((C1-C6 alkyl) methacrylate-butadiene-styrene) copolymer, a poly(styrene-(C1-C6 alkyl) acrylate) copolymer, a poly(acrylonitrile-styrene-(C1-C6 alkyl) acrylate) copolymer, or a crosslinked derivative of one of the foregoing polymers.

In an embodiment, the organic particle may have a polymer or polymer segment (e.g., a block) that is the same as a polymer or polymer segment of the block copolymer. For example, in the composite separator according to an embodiment, when the organic particle is a poly(styrene)-based organic particle and the block copolymer is a poly(styrene-ethylene oxide) block copolymer, due to a poly(styrene) block of the poly(styrene-ethylene oxide) block copolymer having the same composition as the organic particle, the function of the organic particle in the composite electrolyte as a binder may be further improved.

The particle may include: i) a cage-structured silsesquioxane, a metal-organic framework (MOF), $Li_{1+x+y}Al_xTi_{2-x}Si_yP_{3-y}O_{12}$ (wherein $0<x<2$, and $0≤y<3$), $BaTiO_3$, $Pb(Zr_pTi_{1-p})O_3$ (PZT, wherein $0≤p≤1$), $Pb_{1-x}La_xZr_{1-y}Ti_yO_3$ (PLZT) (wherein $0≤x<1$ and $0≤y<1$), $Pb(Mg_3Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_xTi_y(PO_4)_3$ (wherein $0<x<2$ and $0<y<3$), $Li_xAl_yTi_z(PO_4)_3$ (wherein $0<x<2$, $0<y<1$, and $0<z<3$), $Li_{1+x+y}(Al_pGa_{1-p})_x(Ti_qGe_{1-q})_{2-x}Si_yP_{3-y}O_{12}$ (wherein $0≤x≤1$, $0≤y≤1$, $0<p<1$, and $0<q<1$), $Li_xLa_yTiO_3$ (wherein $0<x<2$ and $0<y<3$), $Li_xGe_yP_zS_w$ (wherein $0<x<4$, $0<y<1$, $0<z<1$, and $0<w<5$), $Li_xN_y$ (wherein $0<x<4$, and $0<y<2$), $Li_xSi_yS_z$ (wherein $0<x<3$, $0<y<2$, and $0<z<4$), $Li_xP_yS_z$ (wherein $0≤x<3$, $0<y<3$, and $0<z<7$), $Li_2O$, $LiF$, $LiOH$, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ (wherein M is Te, Nb, or Zr, and $0≤x≤5$), or a combination thereof; or ii) a cross-linked derivative of the foregoing particle.

A thickness of the composite separator may vary depending on thicknesses of the porous substrate and the composite electrolyte. For example, the composite separator may have a thickness of about 4 μm to about 100 μm, about 10 μm to about 100 μm, or about 15 μm to about 30 μm. When the composite separator has a thickness within these ranges, a lithium secondary battery including the composite separator may have improved charging and discharging characteristics due to facilitated transfer of lithium ions.

The porous substrate may have a porosity of about 10% to about 90%, for example, about 20% to about 60%. The term "porosity" used herein is defined as a volume percent of empty spaces (e.g., voids or pores) in a material, with respect to a total volume of the material.

The composite separator according to an embodiment may have improved thermal shrinkage characteristics. For example, after heat treatment at about 140° C. for about 5 minutes, the composite separator may have improved thermal stability with a shrinkage of about 35% or less, for example, about 31% or less, with respect to before the heat treatment. The composite separator may have a lithium ion conductivity at about 25° C. of about 0.001 millisiemens per centimeter (mS/cm) or greater, for example, about 0.01 mS/cm to about 0.5 mS/cm.

The composite separator according to an embodiment may have improved mechanical characteristics, and may have a tensile strength of about 800 megapascals (MPa) or greater, for example, about 900 MPa or greater.

The composite separator according to an embodiment may include a porous substrate, and a composite electrolyte that is present on a surface of the porous substrate and inside a pore of the porous substrate, the composite electrolyte being obtained by complexing an ionic liquid, a block copolymer, and organic particles.

In the lithium secondary battery according to an embodiment, the liquid electrolyte may include a lithium salt at a concentration of about 1 molar (M) to about 6 M, for example, about 1.5 M to about 5 M. The lithium salt may include LiSCN, $LiN(CN)_2$, $LiClO_4$, $LiBF_4$, $LiAsF_6$, $LiPF_6$, $LiCF_3SO_3$, $LiC(CF_3SO_2)_3$, $LiN(SO_2C_2F_5)_2$, $LiN(SO_2CF_3)_2$, $LiN(SO_2F)_2$, $LiSbF_6$, $LiPF_3(CF_2CF_3)_3$, $LiPF_3(CF_3)_3$, $LiB(C_2O_4)_2$, or a combination thereof.

The organic solvent of the liquid electrolyte may comprise ethylene carbonate, propylene carbonate, dimethyl carbonate, diethyl carbonate, ethylmethyl carbonate, fluoroethylene carbonate, γ-butyrolactone, 1,2-dimethoxyethane, 1,2-diethoxyethane, diethylene glycol dimethyl ether, triethylene glycol dimethyl ether, poly(ethylene glycol dimethyl ether), succinonitrile, sulfolane, dimethyl sulfone, ethyl methyl sulfone, diethyl sulfone, adiponitrile, tetraethylene glycol dimethyl ether, 1,1,2,2-tetrafluoroethyl 2,2,3,3-tetrafluoropropyl ether, or a combination thereof.

The porous substrate may have an average pore diameter of less than or equal to 3 μm, for example, about 0.1 μm to about 3 μm, about 0.05 μm to about 2.5 μm, or about 1 μm to about 3 μm. When the average pore diameter of the porous substrate is within these ranges, it may be possible to control the organic particle in the composite electrolyte to not to enter into the pore of the porous substrate.

The porous substrate may comprise, for example, a monolayer of poly(ethylene), poly(propylene), or poly(butylene), or a multiple layer including at least one of the listed materials. For example, the porous substrate may comprise a poly(ethylene) layer, or mixed multilayer such as a two-layered poly(ethylene)/poly(propylene) separator, a three-layered poly(ethylene)/poly(propylene)/poly(ethylene) separator, or a three-layered poly(propylene)/poly(ethylene)/poly(propylene) separator.

Hereinafter, a method of preparing the composite separator according to an embodiment will be further described.

First, an ionic liquid, a block copolymer, particles, and an organic solvent may be mixed together to prepare a composite electrolyte composition.

The organic solvent may be, for example, acetonitrile, tetrahydrofuran, dimethylsulfoxide, dimethylformamide, N-methylpyrrolidone, or a combination thereof. When the particle is an organic particle, the organic particle may be uniformly dispersed and distributed in the composite electrolyte composition due to good miscibility with other components in the composite electrolyte composition.

Next, the composite electrolyte composition may be coated on the porous substrate and then dried to thereby obtain a target composite separator. For example, the drying may be performed at a temperature of about 18° C. to about 40° C., and in an embodiment, at about 20° C. to about 25° C. The coating of the composite electrolyte composition may be performed by any suitable method, not limited to a specific method, for example, using a doctor blade, spin coating, or roll coating.

In the preparing of the composite electrolyte composition, a liquid electrolyte including a lithium salt and a non-aqueous organic solvent may be further added.

In accordance with an embodiment, a lithium secondary battery includes a positive electrode, a negative electrode, and the composite separator according to an embodiment, wherein the composite separator is located between the positive electrode and the negative electrode.

The positive electrode may be prepared according to the following method.

A positive active material, a binder, and a solvent may be mixed to prepare a positive active material composition. A conducting agent may be further added into the positive active material composition. The positive active material composition may be directly coated on a metallic current collector and dried to prepare a positive electrode. In an embodiment, the positive active material composition may be cast on a separate support to form a positive active material film. This positive active material film may then be separated from the support and then laminated on a metallic current collector to prepare a positive electrode.

The binder may facilitate binding of a positive active material and the conducting agent and binding with the current collector. The amount of the binder may be from about 1 part to about 50 parts by weight, with respect to 100 parts by weight of a total weight of the positive active material. Non-limiting examples of the binder include poly(vinylidene fluoride) ("PVdF"), poly(vinyl alcohol), carboxymethylcellulose ("CMC"), starch, hydroxypropylcellulose, cellulose, poly(vinylpyrrolidone), poly(tetrafluoroethylene), poly(ethylene), poly(propylene), an ethylene-propylene-diene terpolymer ("EPDM"), sulfonated EPDM, styrene-butadiene rubber, fluorine rubber, a copolymer thereof, or a combination thereof.

The conducting agent may be any suitable material that does not cause chemical change in the lithium metal battery and have conductivity. Non-limiting examples of the conducting agent include graphite, such as natural graphite or artificial graphite; a carbonaceous material, such as carbon black, acetylene black, Ketjen black, channel black, furnace black, lamp black, or summer black; a conductive fiber, such as carbon fiber or a metal fiber; carbon fluoride; a metal powder, such as aluminum or nickel powder; a conductive whisker, such as zinc oxide or potassium titanate; a conductive metal oxide, such as a titanium oxide; and a conductive material, such as a poly(phenylene) derivative.

A non-limiting example of the solvent may be N-methylpyrrolidone.

The amounts of the positive active material, the conducting agent, the binder, and the solvent may be those used in the manufacture of a lithium metal battery, and can be determined by one of skill in the art without undue experimentation. At least one of the conducting agent, the binder, and the solvent may be omitted depending on the use and structure of a lithium secondary battery.

The positive active material for preparing the positive electrode may include lithium cobalt oxide, lithium nickel cobalt manganese oxide, lithium nickel cobalt aluminum oxide, lithium iron phosphate, lithium manganese oxide, or a combination thereof. However, embodiments are not limited thereto. Any suitable positive active material may be used.

For example, the positive active material may be a compound represented by one of the following formulae: $Li_aA_{1-b}B'_bD_2$ (wherein $0.90 \leq a \leq 1.8$, and $0 \leq b \leq 0.5$); $LiaE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

For example, the positive active material may be a compound represented by Formula 11, a compound represented by Formula 12, or a compound represented by Formula 13.

$$Li_aNi_bCo_cMn_dO_2 \qquad \text{Formula 11}$$

In Formula 11, $0.90 \leq a \leq 1.8$, $0 \leq b \leq 0.9$, $0 \leq c \leq 0.5$, and $0 \leq d \leq 0.5$.

$$Li_2MnO_3 \qquad \text{Formula 12}$$

$$LiMO_2 \qquad \text{Formula 13}$$

In Formula 13, M may be Mn, Fe, Co, or Ni.

The lithium secondary battery according to an embodiment may further include a liquid electrolyte, a solid electrolyte, a gel electrolyte, a polymer ionic liquid, or a combination thereof.

The negative electrode may be a lithium metal negative electrode of a lithium metal or a lithium metal alloy. In an embodiment, negative active material of the negative electrode may comprise a carbonaceous material, silicon, a silicon oxide, a silicon-based alloy, a silicon-carbonaceous material composite, tin, a tin-based alloy, a tin-carbon composite, lithium, a metal alloyable with lithium, an alloy thereof, or an oxide thereof, a metalloid alloyable with lithium, an alloy thereof, or an oxide thereof, or a combination thereof.

Mentioned is a negative electrode in which the negative active material is lithium metal or a lithium metal alloy. The negative active material may be in the form of a thin film.

The lithium metal alloy may include lithium and a metal/metalloid alloyable with lithium. Examples of the metal/metalloid alloyable with lithium may be Si, Sn, Al, Ge, Pb, Bi, Sb, a Si—Y' alloy (wherein Y' may be an alkaline metal, an alkaline earth metal, a Group 13 to Group 16 element, a transition metal, a rare earth element, or a combination thereof, but is not Si), or a Sn—Y' alloy (wherein Y' may be an alkaline metal, an alkaline earth metal, a Group 13 to Group 16 element, a transition metal, a rare earth element, or a combination thereof, but is not Sn). Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

The negative electrode may be a lithium metal negative electrode comprising lithium metal or a lithium metal alloy, wherein the organic particle in the composite electrolyte of the composite separator may be located adjacent to the negative electrode.

The lithium secondary battery according to an embodiment may be, for example, a lithium air battery, a lithium ion battery, or a lithium polymer battery. In an embodiment, the lithium secondary battery may be a lithium metal battery employing a lithium metal negative electrode.

In a lithium metal battery according to an embodiment, a lithium deposition layer having a thickness of about 40 μm or less may be disposed on the lithium metal negative electrode. In the lithium metal battery according to an embodiment using the lithium metal negative electrode, a lithium deposition density on a surface of the lithium metal negative electrode after charging may be about 0.2 grams per cubic centimeter (g/cm$^3$ or g/cc) to about 0.45 g/cm$^3$, for example, about 0.26 g/cm$^3$ to about 0.45 g/cm$^3$, about 0.3 g/cm$^3$ to about 0.43 g/cm$^3$, or about 0.38 g/cm$^3$ to about 0.42 g/cm$^3$. The lithium deposition density may be determined after charging such that a potential of the negative electrode is 0 volts versus Li/Li$^+$.

The lithium secondary battery according to an embodiment may have improved capacity and improved lifetime characteristics, and thus may be used in a battery for use as a power source of a small device, and may also be used as a cell of a battery pack or battery module that includes a plurality of cells for use as a power source of a medium-large size device.

Examples of the battery pack or battery module include a device for an electric vehicle ("EV"), including a hybrid electric vehicle ("HEVs") and a plug-in hybrid electric vehicle ("PHEV"); an electric two-wheeled vehicle, including an E-bikes or an E-scooter; a power tool; a power storage device; or the like. However, embodiments are not limited thereto.

An embodiment of the present disclosure will now be described in detail with reference to the following examples. However, these examples are only for illustrative purposes and are not intended to limit the scope of the one or more embodiments of the present disclosure.

EXAMPLES

Example 1

After 2 weight percent (wt %) of a PS-PEO-PS block copolymer (PS, PEO, and PS blocks mixed in a weight ratio of about 3:7:3) was dissolved in acetonitrile, an electrolyte solution that was obtained by adding 1.53 molar (M) lithium bis(fluorosulfonyl)imide ("LiFSI" or "LiN(SO$_2$F)$_2$") to 1-methyl-1-propylpyrrolidinium bis(fluorosulfonyl) imide) ("PYR$_{13}$FSI") used as an ionic liquid was added thereto. Poly(styrene-b-divinylbenzene) block copolymer microspheres were added to a resulting solution to thereby prepare a composite electrolyte composition. The amount of the ionic liquid in the composite electrolyte composition was about 81 parts by weight, the amount of the PS-PEO-PS block copolymer was about 16 parts by weight, and the amount of the poly(styrene-b-divinylbenzene) block copolymer microspheres was about 3 parts by weight, each with respect to 100 parts by weight of a total weight of the ionic liquid, the PS-PEO-PS block copolymer, and the poly(styrene-b-divinylbenzene) block copolymer microspheres. A mixed ratio of poly(styrene) blocks and poly(divinylbenzene) blocks in the poly(styrene-b-divinylbenzene) block copolymer was about 9:1 by weight.

The composite electrolyte composition was coated on a poly(ethylene) separator (having an average pore diameter of about 2 micrometers (μm), a thickness of about 12 μm, and a porosity of about 48%) used as a porous substrate to a thickness of about 5 μm using a doctor blade. The resulting coated product was dried in a dry room at room temperature (25° C.) for 2 days, and then vacuum-dried at about 60° C. overnight to thereby obtain a composite separator (having a total thickness of about 17 μm). The particle size of the poly(styrene-b-divinylbenzene) block copolymer microspheres was about 3 μm.

Comparative Example 1

A composite separator was obtained in the same manner as in Example 1, except that the composite electrolyte composition was obtained by adding about 11 wt % of poly(vinylidene fluoride) to dimethyl formamide ("DMF") to obtain a solution and then mixing this solution with an electrolyte solution obtained by adding 1.53 M of LiFSI to 1-methyl-1-propylpyrrolidinium bis(fluorosulfonyl) imide ("PYR$_{13}$FSI") used as an ionic liquid.

The amount of the PYR$_{13}$FSI in the composite electrolyte composition was about 69 parts by weight, the amount of the poly(vinylidene fluoride) was about 14 parts by weight, and the amount of the LiFSI was about 17 parts by weight, each with respect to 100 parts by weight of a total weight of the PYR$_{13}$FSI, the poly(vinylidene fluoride), and the LiFSI.

Comparative Example 2

A composite separator was obtained in the same manner as in Comparative Example 1, except that SiO$_2$ was further added in preparing the composite electrolyte composition.

The amount of the SiO$_2$ in the composite electrolyte composition was about 5 parts by weight, with respect to 100 parts by weight of a total weight of the PYR$_{13}$FSI, the poly(vinylidene fluoride), the LiFSI, and the SiO$_2$. The amount of the PYR$_{13}$FSI was about 66 parts by weight, the amount of the poly(vinylidene fluoride) was about 13 parts by weight, and the amount of the LiFSI was about 16 parts by weight, each with respect to 100 parts by weight of a total weight of the PYR$_{13}$FSI, the (polyvinylidene fluoride), the LiFSI, and the SiO$_2$.

According to Comparative Example 2, the SiO$_2$ was found to be present inside pores of the porous substrate of the composite separator and be unevenly distributed in the composite electrolyte.

Comparative Example 3

A poly(ethylene) separator (having an average pore diameter of about 2 μm, a thickness of about 12 μm, and a porosity of about 48%), used as a porous substrate, was used.

Example 1A

Composite separators were prepared in the same manner as in Example 1, except that the average diameter of the poly(styrene-b-divinylbenzene) microsphere ("PS-DVB MS") and the pore size (average diameter) of the poly (ethylene) separator were varied as represented in Table 1.

TABLE 1

| Sample | Average diameter of PS-DVB MS (μm) | Size (Average pore diameter) of PE separator (μm) |
|---|---|---|
| 1 | 5 | 4 |
| 2 | 7 | 6 |
| 3 | 10 | 9 |
| 4 | 20 | 15 |

Example 1B

Composite separators were prepared in the same manner as in Example 1, except that the amount of the poly(styrene-b-divinylbenzene) microsphere (PS-DVB MS) was varied as represented in Table 2.

TABLE 2

| Sample | Amount of poly(styrene b-divinylbenzene) microspheres (PS-DVB MS) |
|---|---|
| 1 | 5 |
| 2 | 7 |
| 3 | 10 |
| 4 | 15 |

Example 2

The composite separator prepared in Example 1 was stacked on a lithium metal thin film (having a thickness of about 40 μm) such that the composite electrolyte of the composite separator was located adjacent to the lithium metal thin film, thereby preparing a negative electrode with the composite separator stacked thereon.

Aside from the foregoing process, LiNi$_{0.6}$Co$_{0.2}$Al$_{0.2}$O$_2$ ("NCA"), a conductive agent (Super-P, available from Timcal Ltd.), poly(vinylidene fluoride) ("PVdF"), and N-methylpyrrolidone were mixed together to prepare a positive active material layer-forming composition. In the positive active material layer-forming composition, a weight ratio of the LiNi$_{1/3}$CO$_{1/3}$Mn$_{1/3}$O$_2$, the conducting agent, and the PVdF was about 97:1.5:1.5, the amount of N-methylpyrrolidone was about 137 grams (g), and the amount of LiNi$_{1/3}$Co$_{1/3}$Mn$_{1/3}$O$_2$ was 97 g.

The positive active material layer-forming composition was coated on an aluminum foil (having a thickness of about 15 μm), dried at a temperature of about 25° C., and further dried in a vacuum at a temperature of about 110° C. to thereby manufacture a positive electrode.

A lithium metal battery (pouch cell) was manufactured from the positive electrode and the negative electrode with the composite separator thereon obtained according to the above-described processes.

A liquid electrolyte was added between the positive electrode and the negative electrode. The liquid electrolyte used was an electrolyte solution obtained by dissolving 1.5 M LiN(SO$_2$F)$_2$ (also referred to as LiFSI) in PYR$_{13}$FSI.

Example 3

A lithium metal battery (pouch cell) was manufactured in the same manner as in Example 2, except that an electrolyte solution obtained by dissolving 4 M LiFSI in dimethylether ("DME") was used as the liquid electrolyte, instead of the electrolyte solution of 1.5 M LiN(SO$_2$F)$_2$ (also referred to as LiFSI) dissolved in PYR$_{13}$FSI.

As a result, in the lithium metal battery of Example 3, a gel electrolyte was formed between the positive electrode and the composite separator. The gel electrolyte was obtained from the electrolyte solution of 4 M LiFSI dissolved in DME.

Example 4

A lithium metal battery was manufactured in the same manner as in Example 3, except that the composite separator prepared according to Example 1A was used instead of the composite separator of Example 1.

Comparative Examples 4-6

Lithium metal batteries were manufactured in the same manner as in Example 2, except that the composite separators of Comparative Examples 1 and 2 and the poly(ethylene) separator of Comparative Example 3 were used, respectively.

Comparative Example 7

A lithium metal battery was manufactured in the same manner as in Example 3, except that the poly(ethylene) separator of Comparative Example 3 was used instead of the composite separator of Example 1.

Evaluation Example 1: Wettability to Electrolyte Solution 0.2 mL of a high-viscosity electrolyte solution (1.5 M LiFSI in Pyr$_{13}$FSI) was dropped onto the composite separator of Example 1 and the poly(ethylene) separator of Comparative Example 3. After 1 minute, wettability to the high-viscosity electrolyte solution was evaluated.

Figure 3A:
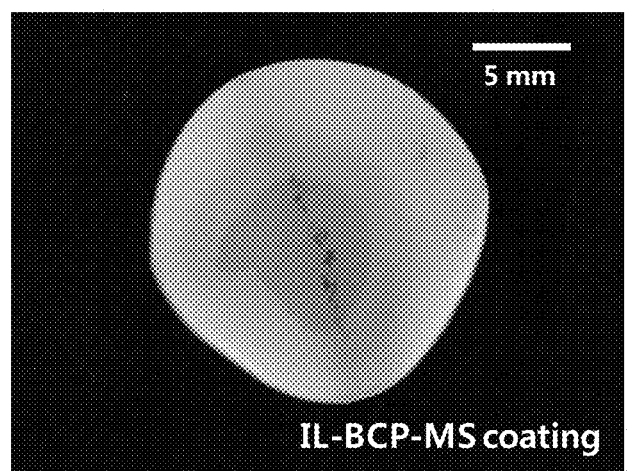
FIGS. 3A and 3B illustrate results of wettability evaluation of a composite separator of Example 1 and a poly(ethylene) separator of Comparative Example 3 to a high-viscosity electrolyte solution.
Figure 3B:
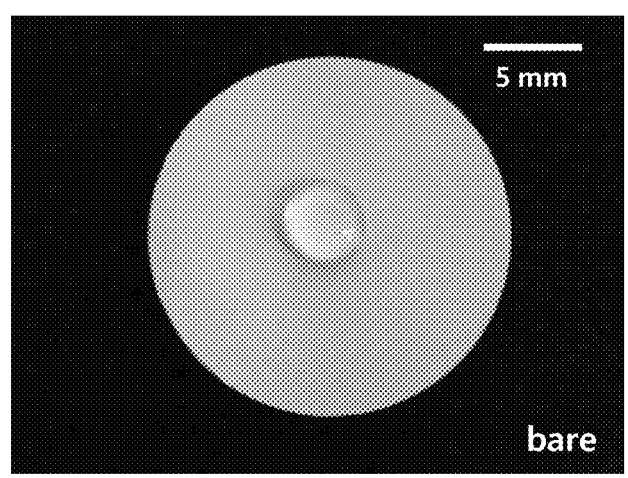

The results of the evaluation of wettability to the high-viscosity electrolyte solution are shown in FIGS. 3A and 3B, in which "IL-BCP-MS coating" refers to the ionic liquid-block copolymer-microsphere coating of the composite separator of Example 1, and "bare" refers to the poly (ethylene) separator of Comparative Example 3.

Referring to FIG. 3B, a droplet of the high-viscosity electrolyte solution remained not absorbed on the surface of the poly(ethylene) separator of Comparative Example 3, whereas the composite separator of Example 1 was found to have improved wettability to the high-viscosity electrolyte solution, as compared with the poly(ethylene) separator of Comparative Example 3.

Evaluation Example 2: Mechanical Strength (Tensile Modulus)

Tensile moduli of the composite separator of Example 1 and the poly(ethylene) separator of Comparative Example 3 were measured using a DMA800 (available from TA Instruments). Samples for the tensile modulus measurement were prepared according to the ASTM standard D412 (Type V specimens). The tensile modulus is also known as Young's modulus.

Variations in strain with respect to stress in each separator sample were measured at about 25° C., a relative humidity of about 30%, and a rate of 5 millimeters per minute (mm/min). The tensile modulus was calculated from the slope of a stress-strain curve. The tensile modulus evaluation results of the composite separator of Example 1 and the poly(ethylene) separator of Comparative Example 3 are shown in FIGS. 4A and 4B, respectively.

Figure 4A:
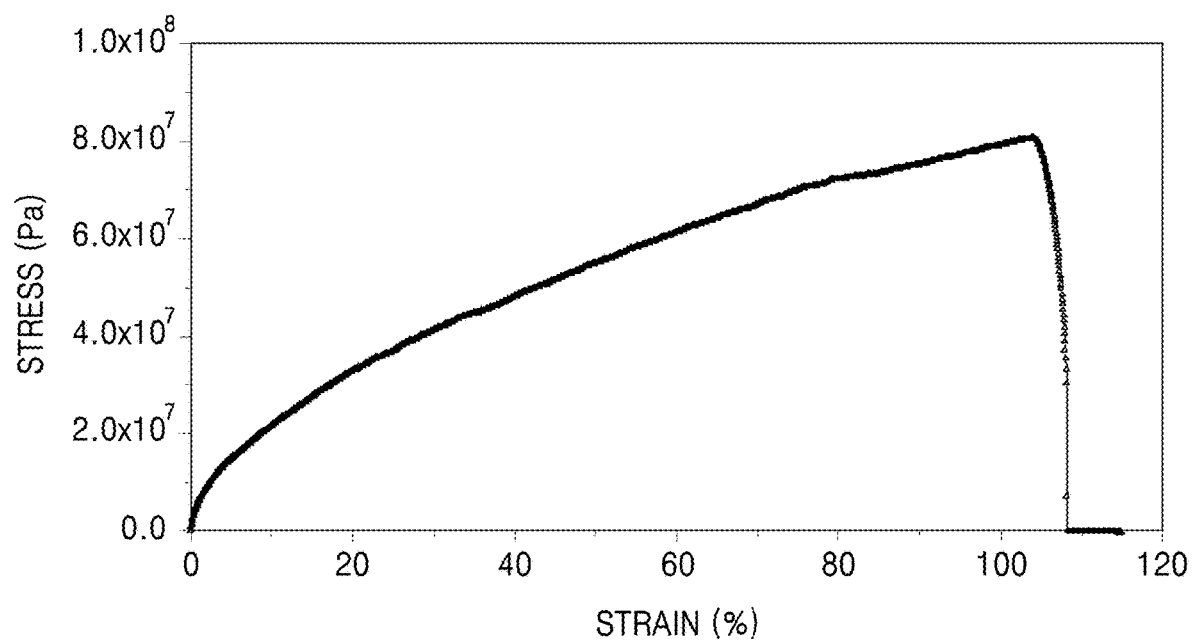
FIGS. 4A and 4B are graphs of stress (pascals (Pa)) versus strain (percent (%)) that illustrate results of tensile modulus measurement of the composite separator of Example 1 and the poly(ethylene) separator of Comparative Example 3, respectively.
Figure 4B:
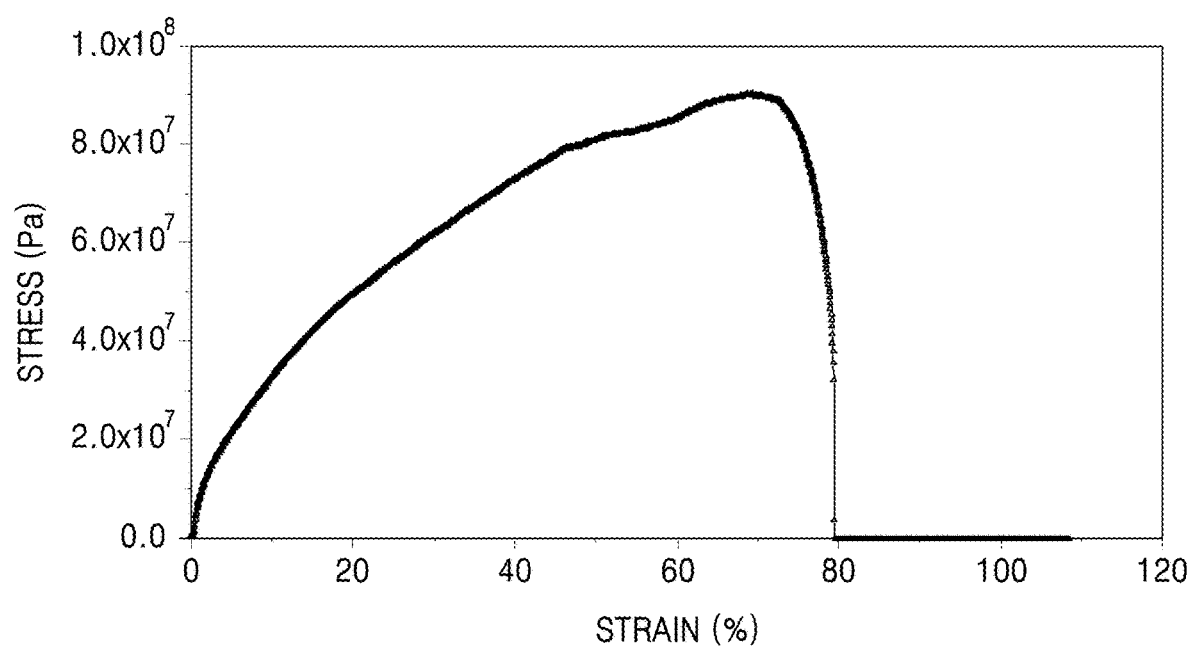

Referring to FIGS. 4A and 4B, the composite separator of Example 1 was found to have an improved tensile modulus of about 930 megapascals (MPa), as compared with the poly(ethylene) separator of Comparative Example 3 having a tensile modulus of about 241 MPa. Thus, using the composite separator of Example 1 having such characteristics may effectively suppress volumetric change of the lithium metal negative electrode and growth of lithium dendrite.

Evaluation Example 3: Thermal Stability

Figure 5A:
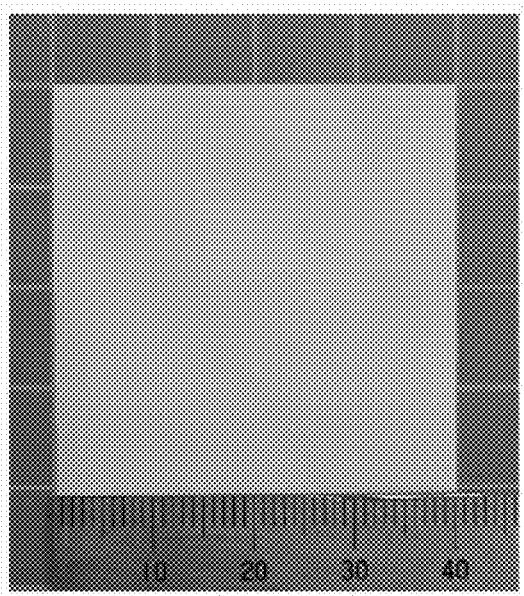
FIGS. 5A and 5B illustrate states of the composite separator of Example 1 and the poly(ethylene) separator of Comparative Example 3 after thermal treatment, respectively.
Figure 5B:
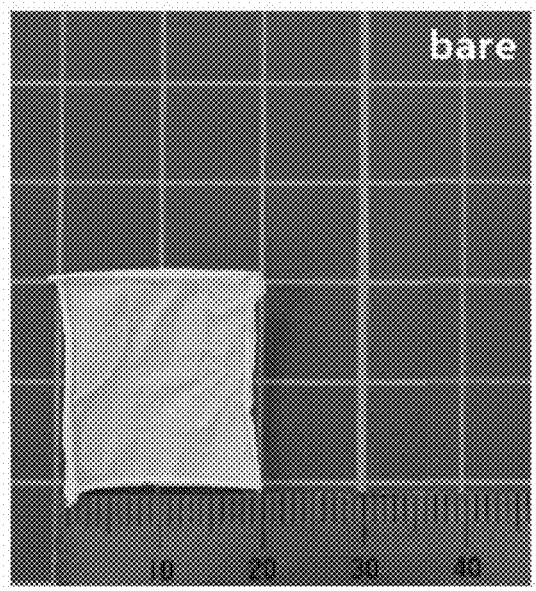
Figure 5C:
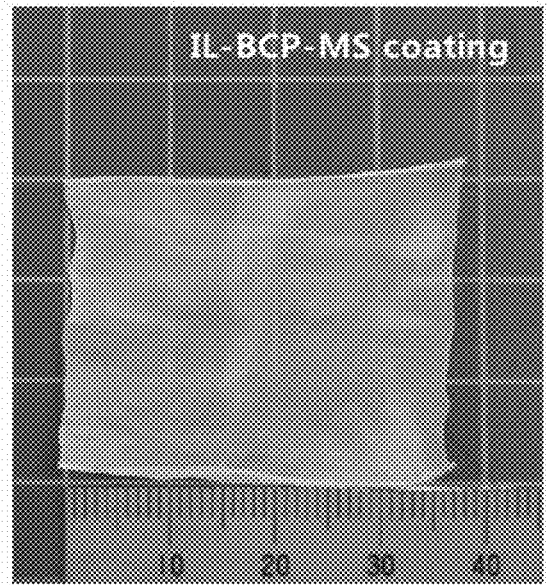
FIG. 5C illustrates a state of the poly(ethylene) separator of Comparative Example 3 before thermal treatment.

Heat shrinkage characteristics of the composite separator of Example 1 and the poly(ethylene) separator of Comparative Example 3 were evaluated after thermal treatment at about 140° C. for about 5 minutes. The thermal shrinkage characteristics are shown in FIGS. 5A to 5C. FIG. 5C shows the state of the poly(ethylene) separator of Comparative Example 3 having an area of about 16 square centimeters ($cm^2$) before the thermal treatment. FIGS. 5A and 5B show the states of the composite separator of Example 1 and the poly(ethylene) separator of Comparative Example 3 after the thermal treatment, respectively.

Referring to FIGS. 5A and 5B, the composite separator of Example 1 was found to have a reduced area of about 11.1 $cm^2$ and a heat shrinkage of about 30% after the thermal treatment, while the poly(ethylene) separator of Comparative Example 3 had an area of about 4 $cm^2$ and a heat shrinkage of about 75% after the thermal treatment. These results indicate that the composite separator of Example 1 had improved thermal stability as compared with the poly (ethylene) separator of Comparative Example 3.

Evaluation Example 4: Impedance

The alternating current (AC) impedance analysis of the lithium metal batteries of Example 2 and Comparative Example 6 measured by using an impedance analyzer (Solartron 1260A Impedance/Gain-Phase Analyzer) at a temperature of about 25° C., according to the 2-probe method. The amplitude was about ±10 milli Volts (mV), and the frequency range was in a range of about 0.1 Hertz (Hz) to about 1 mega Hertz (MHz).

Figure 6A:
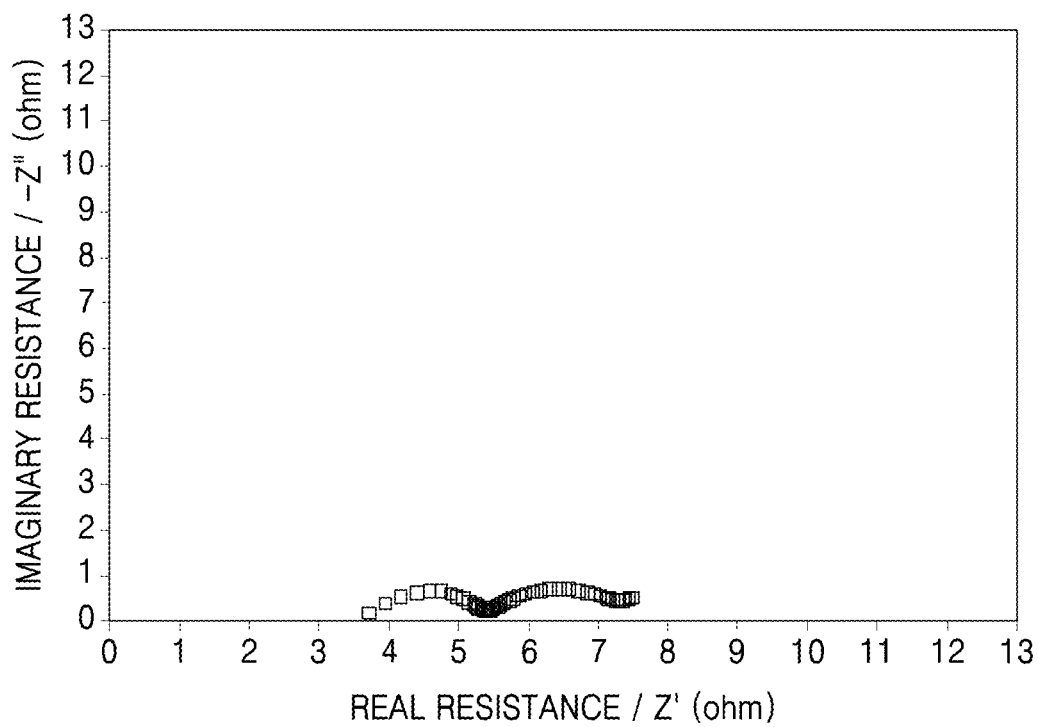
FIGS. 6A and 6B are graphs of real resistance (Z', (ohm)) versus imaginary resistance(—Z" (ohm)) and illustrate impedance characteristics of lithium metal batteries manufactured in Example 2 and Comparative Example 6, respectively.
Figure 6B:
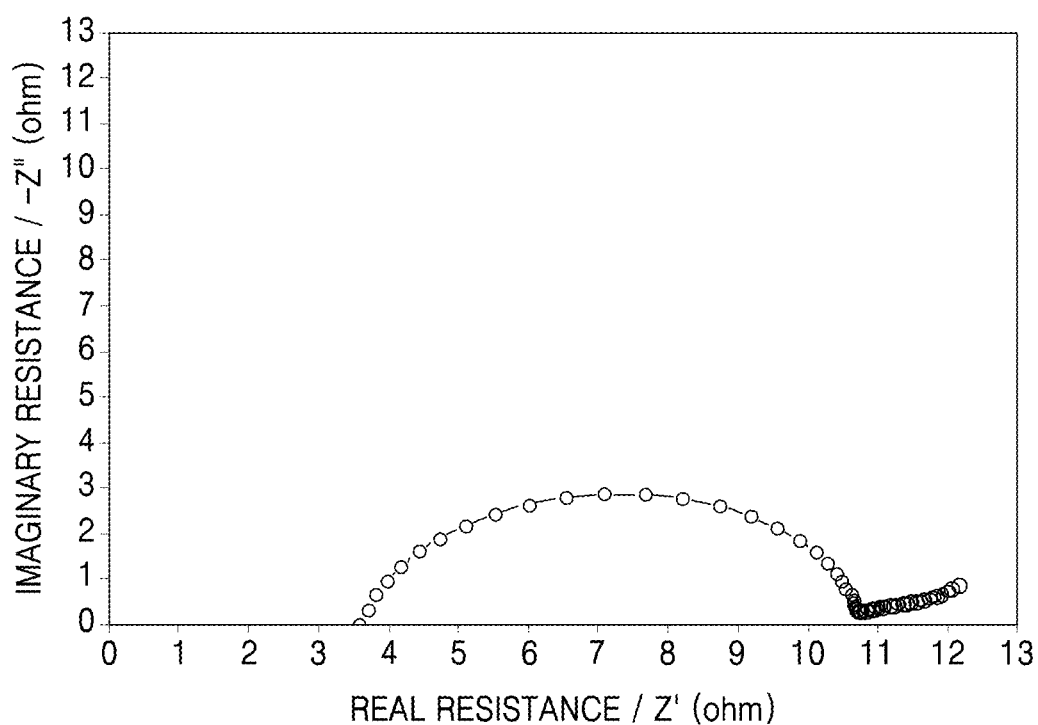

Nyquist plots obtained from the impedance measurements that were performed after 24 hours from the manufacture of the lithium metal batteries of Example 2 and Comparative Example 6 are shown in FIGS. 6A and 6B. Referring to FIGS. 6A and 6B, the interfacial resistance between the negative electrode and the electrolyte may be determined by the position and size of the semicircle. FIGS. 6A and 6B represent impedance characteristics of the lithium metal batteries of Example 2 and Comparative Example 6, respectively.

Referring to FIGS. 6A and 6B, the lithium metal battery of Example 2 was found to have a reduced interfacial resistance as compared with the lithium metal battery of Comparative Example 6.

Evaluation Example 5: Coulombic Efficiency

1) Example 2 and Comparative Example 6

Each of the lithium metal batteries of Example 2 and Comparative Example 6 was charged at about 25° C. with a constant current of 0.1 C until a voltage of about 4.10 Volts (V) (with respect to Li) was reached, and then with a constant voltage of 4.10 V until a cutoff current of 0.05 C was reached. Subsequently, each of the lithium metal batteries was then discharged with a constant current of 0.1 C until a voltage of about 3.0 V (with respect to Li) was reached (Formation process, $1^{st}$ cycle). This cycle of charging and discharging was performed two times more to complete the formation process.

After the formation process, each of the lithium metal batteries was charged at about 60° C. with a constant current of 0.5 C at about 1.3 milliampere hours per square centimeter ($mAh/cm^2$), and then discharged with a constant current of 0.5 C, in a voltage range of about 3.0 V to 4.1 V (with respect to lithium metal).

This cycle of charging and discharging was repeated 100 times in total. Charging and discharging characteristics (Coulombic efficiencies) of the lithium metal batteries of Example 2 and Comparative Example 6 are shown in FIGS. 7A and 7B, respectively.

Figure 7A:
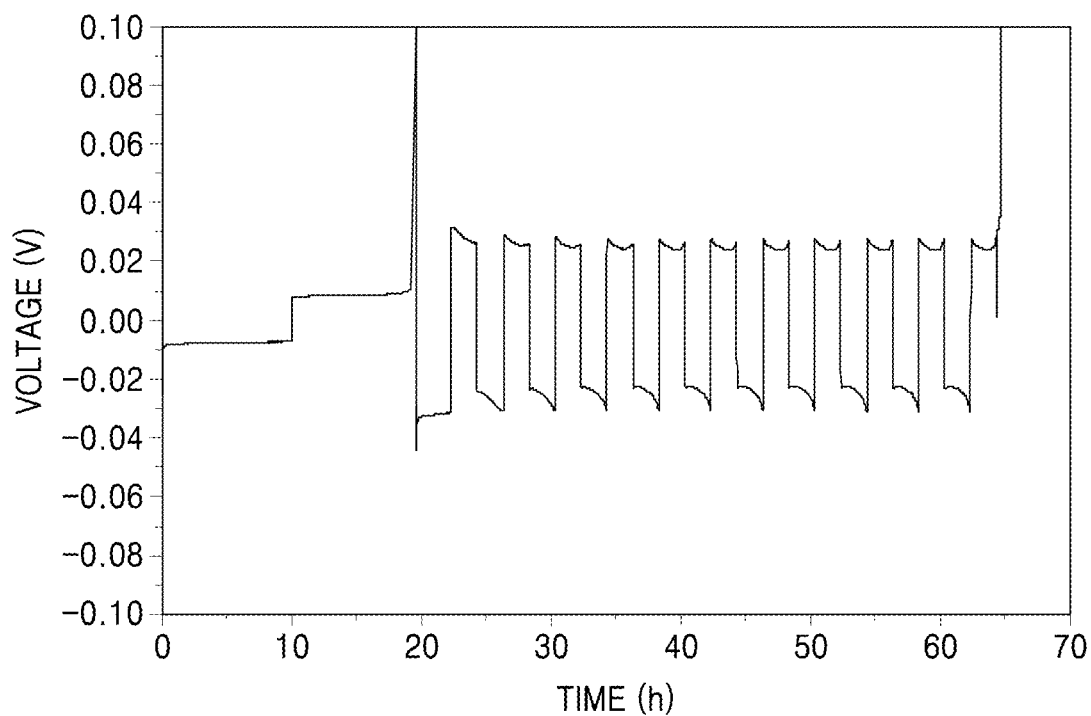
FIGS. 7A and 7B are graphs of voltage (volts (V)) versus time (hours (h)) that illustrate charging and discharging characteristics (Coulombic efficiency) of lithium metal batteries manufactured in Example 2 and Comparative Example 6, respectively.
Figure 7B:
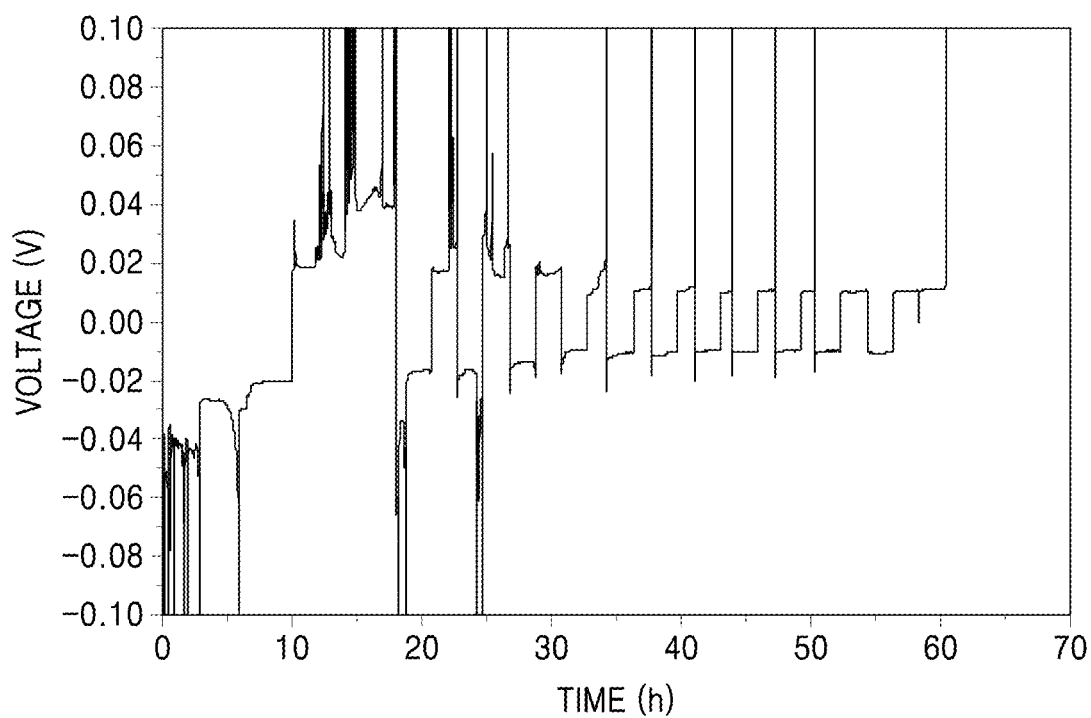

Referring to FIGS. 7A and 7B, the lithium metal battery of Example 2 using the composite separator was found to have improved charging and discharging characteristics with a Coulombic efficiency of about 99.03%, as compared with the lithium metal battery of Comparative Example 6 having a Coulombic efficiency of about 86.61%.

2) Example 3 and Comparative Example 7

Coulombic efficiencies of the lithium metal batteries of Example 3 and Comparative Example 7 were measured in the same manner as applied above to the lithium metal batteries of Example 2 and Comparative Example 6. The results are shown in FIGS. 8A and 8B.

Figure 8A:
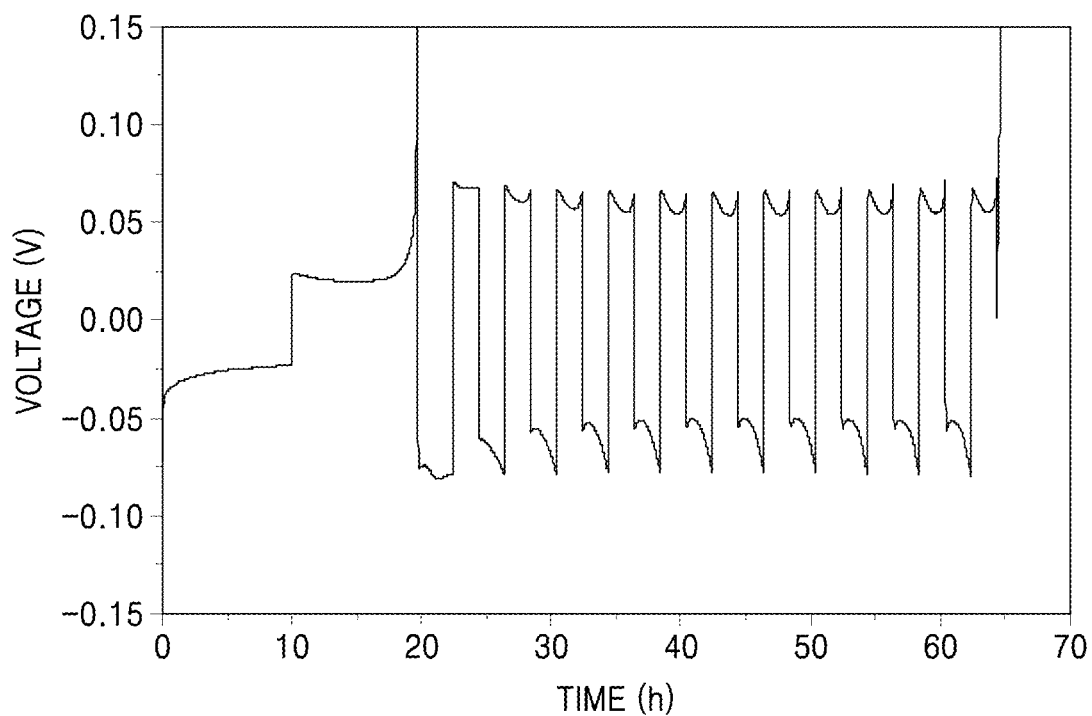
FIGS. 8A and 8B are graphs of voltage (V) versus time (h) that illustrate charging and discharging characteristics (Coulombic efficiency) of lithium metal batteries of Example 3 and Comparative Example 7, respectively.
Figure 8B:
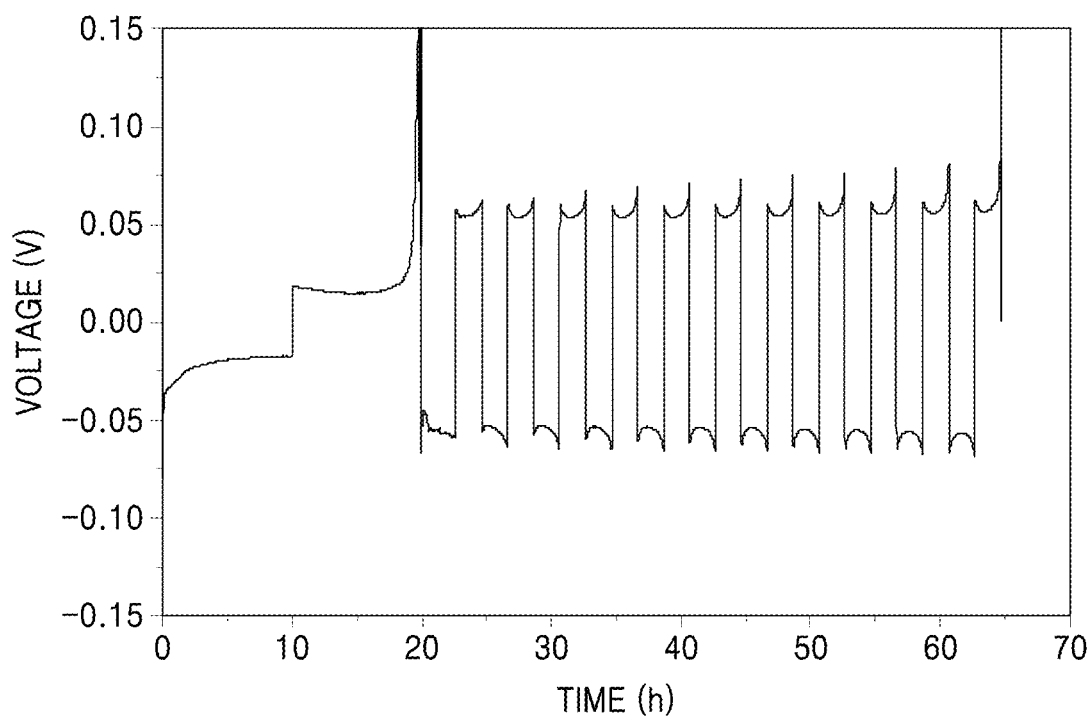

Referring to FIGS. 8A and 8B, the lithium metal battery of Example 3 was found to have a Coulombic efficiency of about 99.10%, which was increased even with the use of the high-concentration electrolyte solution, as compared with the lithium metal battery of Comparative Example 7 having a Coulombic efficiency of about 97.84%.

Evaluation Example 6: Lithium Deposition Density

Each of the lithium metal batteries manufactured in Example 2 and Comparative Example 4 was charged with a constant current of 0.1 C (0.38 mA/cm$^2$) at a temperature of about 25° C. until a voltage of about 4.40 V (with respect to Li) was reached, and then at a constant voltage of 4.40 V (constant voltage mode) until a cutoff current of 0.05 C rate was reached. After this one-time charging, changes in the outside thickness of the pouch of each lithium metal battery, and deviation in thickness of the lithium deposition layer on each negative electrode were measured with a lithium micrometer. The results of the lithium deposition density evaluation are shown in Table 3.

TABLE 3

| Example | Change in outside thickness of pouch (μm) | Thickness deviation of lithium deposition layer (μm) | Lithium deposition density (g/cm$^3$) |
| --- | --- | --- | --- |
| Example 2 | 10.8 | 1 | 0.38-0.42 |
| Comparative Example 4 | 17.7 | 10 | 0.24-0.26 |

Referring to Table 3, the lithium metal battery of Example 2 was found to have an increased lithium deposition density, as compared with the lithium metal battery of Comparative Example 4. The lithium metal battery of Example 2 was also found to have a reduced thickness deviation of the lithium deposition layer, as compared to the lithium metal battery of Comparative Example 4.

Evaluation Example 7: Cell Lifetime

Each of the lithium metal batteries manufactured in Example 2 and Comparative Example 4 was charged with a constant current of 0.1 C at a temperature of about 25° C. until a voltage of about 4.40 V (with respect to Li) was reached, and then at a constant voltage of 4.40 V (constant voltage mode) until a cutoff current of 0.05 C was reached. Subsequently, each of the lithium metal batteries was then discharged with a constant current of 0.1 C until a voltage of about 2.8 V (with respect to Li) was reached (Formation process, 1$^{st}$ cycle). This cycle of charging and discharging was performed two times more to complete the formation process.

Each of the lithium metal batteries after the formation process was charged at room temperature (25° C.) with a constant current of 0.7 C, and then discharged with a constant current of 0.5 C, in a voltage range of about 3.0 V to 4.1 V (with respect to lithium metal).

Figure 9A:
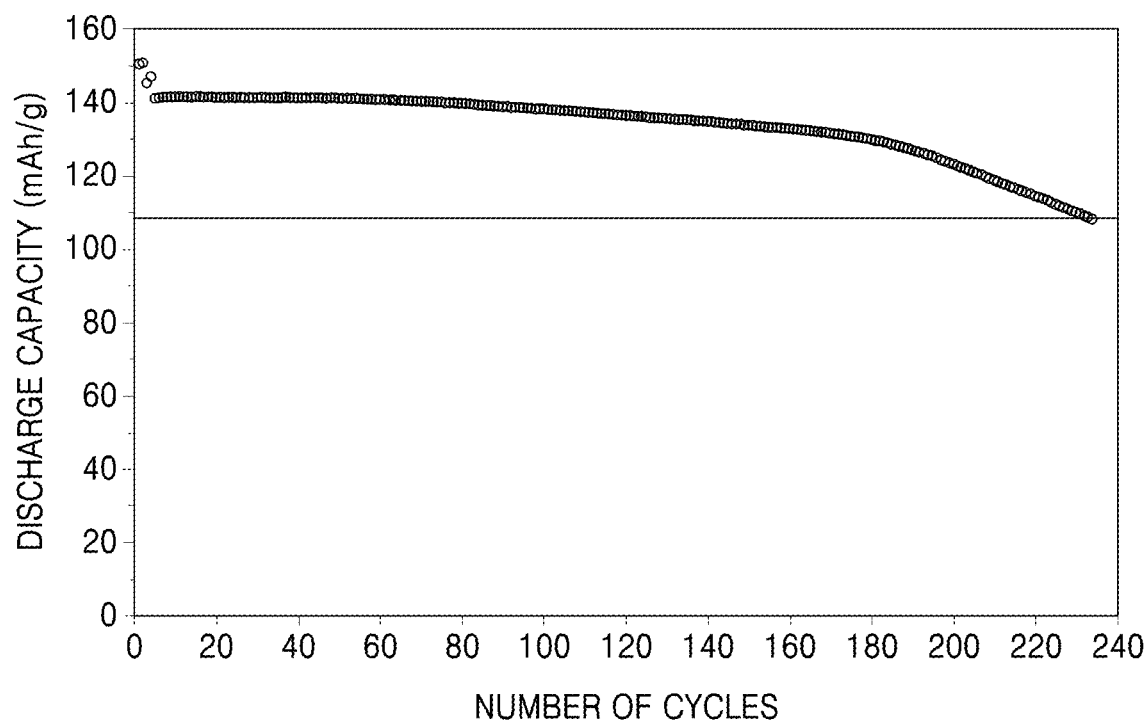
FIGS. 9A and 9B are graphs of discharge capacity (milliampere hours per gram (mAh/g)) versus number of cycles that illustrate lifetime characteristics of lithium metal batteries manufactured in Example 2 and Comparative Example 4, respectively.
Figure 9B:
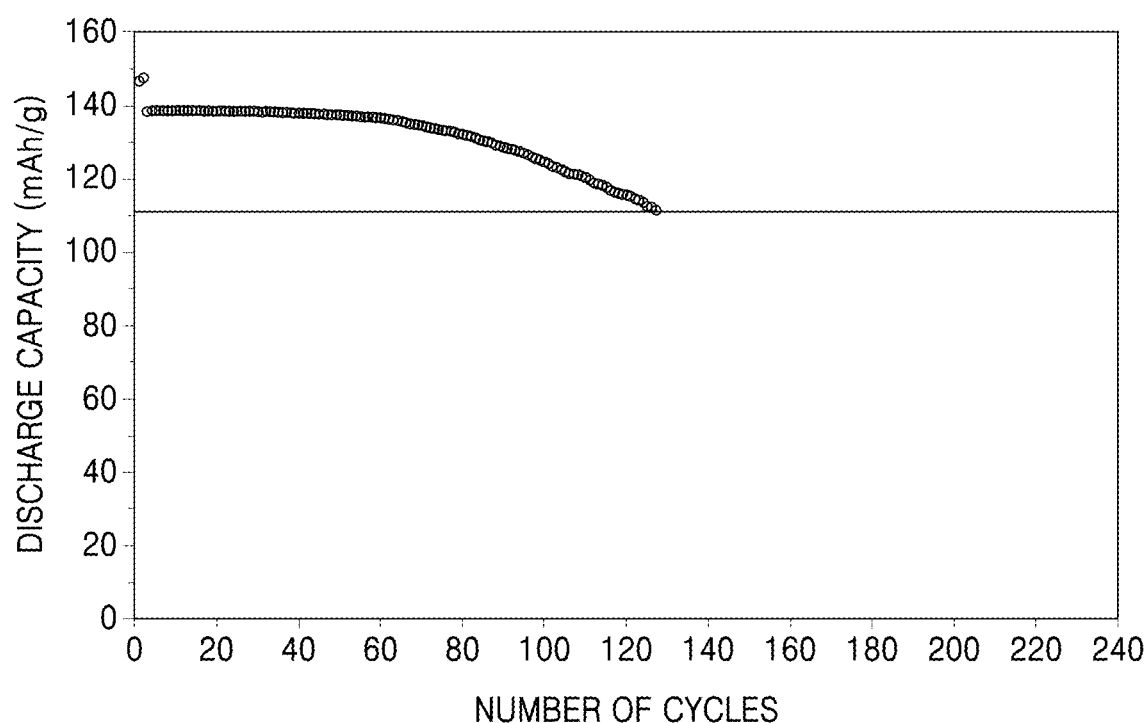

This cycle of charging and discharging was repeatedly performed. The results of the evaluation of charging and discharging characteristics (cell lifetime characteristics) are shown in FIGS. 9A and 9B.

A capacity retention of each of the lithium metal batteries was calculated according to Equation 1. The calculated capacity retentions of the lithium metal batteries of Example 2 and Comparative Example 4 are shown in Table 4.

Capacity retention (%)=(Discharge capacity at 100$^{th}$ cycle/Discharge capacity at 1$^{st}$cycle)×100%    Equation 1

TABLE 4

| Example | Capacity retention (%) |
| --- | --- |
| Example 2 | 98 |
| Comparative Example 4 | 88.9 |

Referring to Table 4 and FIGS. 9A and 9B, the lithium metal battery of Example 2 was found to have an improved capacity retention, as compared with the lithium metal battery of Comparative Example 4.

As described above, a composite separator according to an embodiment may have improved wettability to an ionic liquid or a high-viscosity electrolyte solution, improved thermal stability, and improved mechanical strength. In a lithium secondary battery using the composite separator, growth of lithium dendrite on a negative electrode may be effectively suppressed. By using the composite separator, a lithium secondary battery in which a volume change during charge and discharge may be effectively suppressed, having an improved deposition density of a lithium deposition layer and improved cell lifetime, may be manufactured.

It should be understood that embodiments described herein should be considered in a descriptive sense only and not for purposes of limitation. Descriptions of features, advantages, or aspects within each embodiment should be considered as available for other similar features, advantages, or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. A composite separator comprising:
a porous substrate; and
a composite electrolyte on a surface of the porous substrate, the composite electrolyte comprising a block copolymer, an ionic liquid, and an organic particle, wherein
a size of the particle is larger than a pore size of the porous substrate,
the ionic liquid includes a cation and an anion,
the particle of the composite electrolyte is not present inside a pore of the porous substrate, and is present only on the surface of the porous substrate, and the ionic liquid and the block copolymer of the composite electrolyte are present both in the pore of the porous substrate and on the surface of the porous substrate,
the particle comprises poly(styrene), a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C6 alkyl) methacrylate-butadiene-styrene) copolymer, a poly(styrene-(C1-C6 alkyl) acrylate) copolymer, a poly(acrylonitrile-styrene-(C1-C6 alkyl) acrylate) copolymer, a cross-linked derivative of the foregoing polymers, or a combination thereof, the block copolymer is a poly(styrene-ethylene oxide-styrene) block copolymer, a poly(styrene-isoprene-styrene) block copolymer, a poly(styrene-ethylene-styrene) block copolymer, a poly(methyl methacrylate-butylene) block copolymer, or a combination thereof, the cation of the ionic liquid comprises an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, or a combination thereof, the anion of the ionic liquid comprises $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$ or a combination thereof, the porous substrate has an average pore diameter of less than 3 micrometers, a content of the block copolymer is about 1 part to less than 30 parts by weight, with respect to 100 parts by weight of a total weight of the ionic liquid, the block copolymer, and the particle, and the particle is a microsphere having an average particle diameter of greater than 3 micrometers to about 7 micrometers.

2. The composite separator of claim 1, wherein a content of the particle is about 1 part to about 50 parts by weight, with respect to 100 parts by weight of a total weight of the ionic liquid, the block copolymer and the particle.

3. The composite separator of claim 1, wherein the block copolymer is a poly(styrene-ethylene oxide-styrene) block copolymer.

4. The composite separator of claim 1, wherein the particle comprises a poly(styrene-divinylbenzene) copolymer.

5. The composite separator of claim 1, wherein: the block copolymer is a poly(styrene-ethylene oxide-styrene) block copolymer, the particle comprises a poly(styrene-divinylbenzene) copolymer, the cation of the ionic liquid comprises a pyrrolidinium cation, and the anion of the ionic liquid comprises $(FSO_2)_2N^-$.

6. The composite separator of claim 5, further comprising a liquid electrolyte comprising a lithium salt and an organic solvent.

7. The composite separator of claim 6, wherein a concentration of the lithium salt in the liquid electrolyte is about 1 molar to about 6 molar.

8. The composite separator of claim 6, wherein the lithium salt comprises $LiN(SO_2F)_2$.

9. The composite separator of claim 6, wherein a concentration of the lithium salt in the liquid electrolyte is about 1.5 molar to about 5 molar.

10. The composite separator of claim 1, wherein the composite separator has a thickness of about 4 micrometers to about 100 micrometers.

11. The composite separator of claim 1, wherein the porous substrate has a porosity of about 10% to about 90%, and the porous substrate is a form of a film comprising poly(ethylene), poly(propylene), poly(butylene), or a combination thereof.

12. A lithium secondary battery comprising:
a positive electrode;
a negative electrode; and
the composite separator of claim 1 located between the positive electrode and the negative electrode.

13. The lithium secondary battery of claim 12, wherein the negative electrode comprises a carbonaceous material, silicon, a silicon oxide, a silicon alloy, a silicon-carbonaceous material composite, tin, a tin alloy, a tin-carbon composite, lithium, a metal alloyable with lithium, an alloy thereof, an oxide thereof, metalloid alloyable with lithium, an alloy thereof, or an oxide thereof, or a combination thereof.

14. The lithium secondary battery of claim 12, wherein the lithium secondary battery further comprises a liquid electrolyte, a solid electrolyte, a gel electrolyte, a polymer ionic liquid, or a combination thereof.

15. The lithium secondary battery of claim 12,
wherein the negative electrode is a lithium metal electrode or a lithium metal alloy electrode, and
wherein the particle of the composite electrolyte in the composite separator is disposed adjacent to the negative electrode.

16. The lithium secondary battery of claim 12,
wherein the negative electrode is a lithium metal electrode or a lithium metal alloy electrode, and
wherein the negative electrode comprises a lithium deposition layer having a thickness of about 40 micrometers or less.

17. The lithium secondary battery of claim 12, wherein a lithium deposition density of the negative electrode is about 0.2 grams per cubic centimeter to about 0.45 grams per cubic centimeter, wherein lithium deposition density is determined after the lithium secondary battery is charged such that the negative electrode has a potential of 0 volts versus $Li/Li^+$.

18. A method of preparing the composite separator of claim 1, the method comprising:
mixing the ionic liquid, the block copolymer, the particle, and an organic solvent to provide a composite electrolyte composition;
coating the composite electrolyte composition on the porous substrate; and
drying a coated composition to prepare the composite separator.

19. The method of claim 18, wherein the mixing to provide the composite electrolyte composition further comprises adding a liquid electrolyte comprising a lithium salt and a non-aqueous organic solvent to the ionic liquid, the block copolymer, the particle, and the organic solvent.

20. The lithium secondary battery of claim 17, wherein a lithium deposition density on the negative electrode after the lithium secondary battery is charged is greater than 0.26 grams per cubic centimeter to about 0.45 grams per cubic centimeter.

21. The composite separator of claim 1, wherein
the composite electrolyte comprises a plurality of particles, and
none of the plurality of particles are present inside a pore of the porous substrate.

22. The composite separator of claim 1, wherein the ionic liquid is an ionic material in a molten state at room temperature (25° C.).

\* \* \* \* \*